United States Patent
Rudi et al.

(10) Patent No.: US 12,285,692 B2
(45) Date of Patent: Apr. 29, 2025

(54) CLASSIFYING GAMING ACTIVITY TO IDENTIFY DESIRABLE BEHAVIOR

(71) Applicant: Sony Interactive Entertainment LLC, San Mateo, CA (US)

(72) Inventors: Olga Rudi, San Francisco, CA (US); Lucie Roberts, San Jose, CA (US); Rebecca MacDonald, San Jose, CA (US)

(*) Notice: Subject to any disclaimer, the term of this patent is extended or adjusted under 35 U.S.C. 154(b) by 121 days.

(21) Appl. No.: 18/180,067

(22) Filed: Mar. 7, 2023

(65) Prior Publication Data

US 2023/0219007 A1 Jul. 13, 2023

Related U.S. Application Data

(63) Continuation of application No. 16/945,568, filed on Jul. 31, 2020, now Pat. No. 11,596,870.

(51) Int. Cl.
| | |
|---|---|
| *A63F 13/75* | (2014.01) |
| *A63F 13/79* | (2014.01) |
| *G06F 18/24* | (2023.01) |
| *G06N 20/00* | (2019.01) |

(52) U.S. Cl.
CPC .............. *A63F 13/75* (2014.09); *A63F 13/79* (2014.09); *G06F 18/24* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 2009/0111583 A1* | 4/2009 | Zalewski | A63F 13/35 463/42 |
| 2015/0343313 A1* | 12/2015 | Kaleta | G07F 17/3272 463/29 |
| 2017/0282063 A1* | 10/2017 | Krishnamurthy | A63F 13/69 |
| 2020/0164278 A1* | 5/2020 | Andre | G06Q 10/10 |
| 2020/0206637 A1* | 7/2020 | Robbins | G06F 16/903 |
| 2021/0272584 A1* | 9/2021 | McAlpine | A63F 13/215 |
| 2021/0402304 A1* | 12/2021 | Dorn | G06N 20/00 |

* cited by examiner

*Primary Examiner* — Jason T Yen
(74) *Attorney, Agent, or Firm* — Kilpatrick Townsend & Stockton LLP

(57) ABSTRACT

A method of controlling online gaming behavior. The method including monitoring at a game server a plurality of game plays of a plurality of players playing a video game in a gaming session over a period of time. The method including extracting features from the plurality of game plays related to a plurality of activities associated with the plurality of game plays, the plurality of activities being controlled by the plurality of players. The method including running the features through an artificial intelligence (AI) learning model configured to classify the plurality of activities. The method including classifying an activity as abusive behavior.

20 Claims, 15 Drawing Sheets

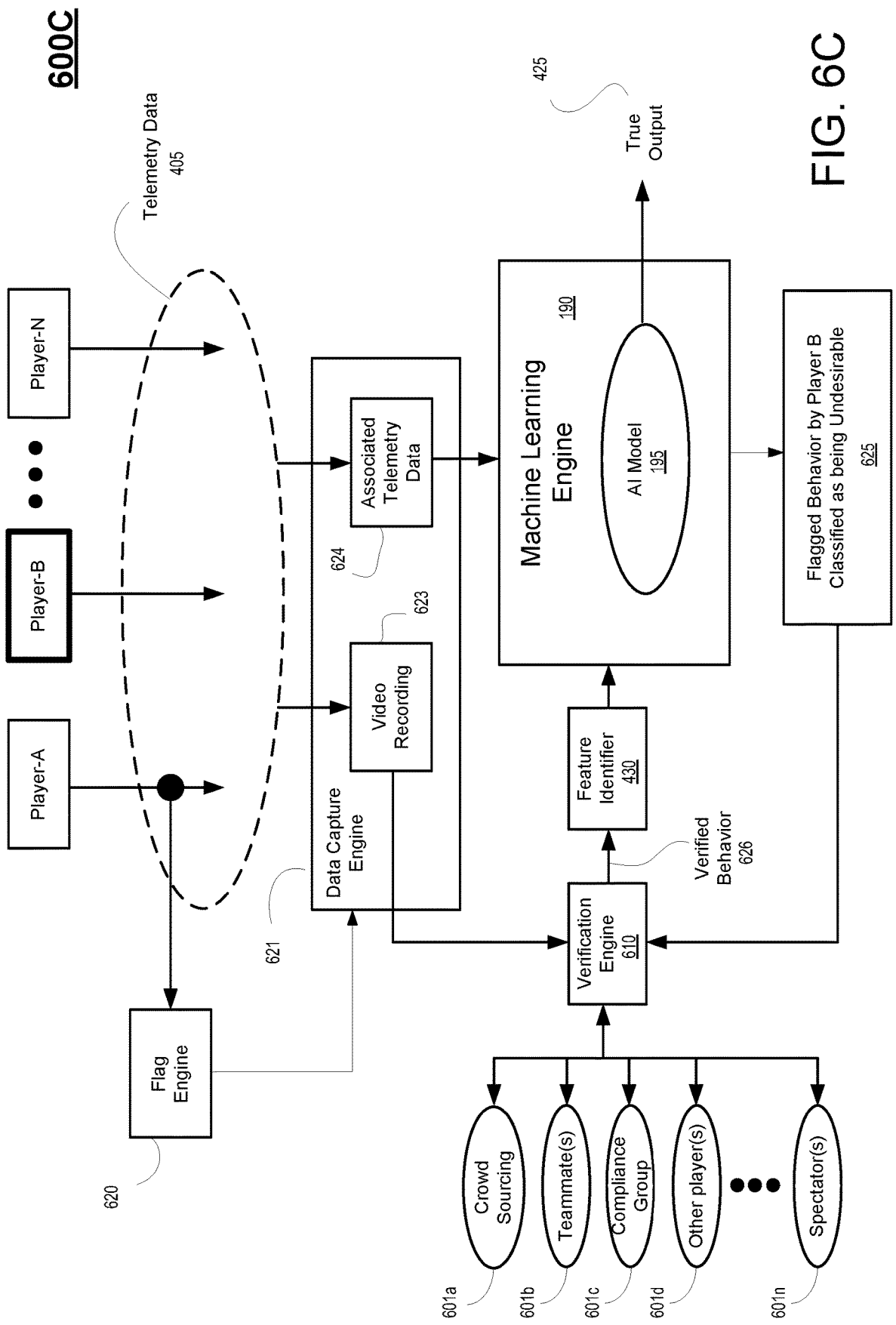

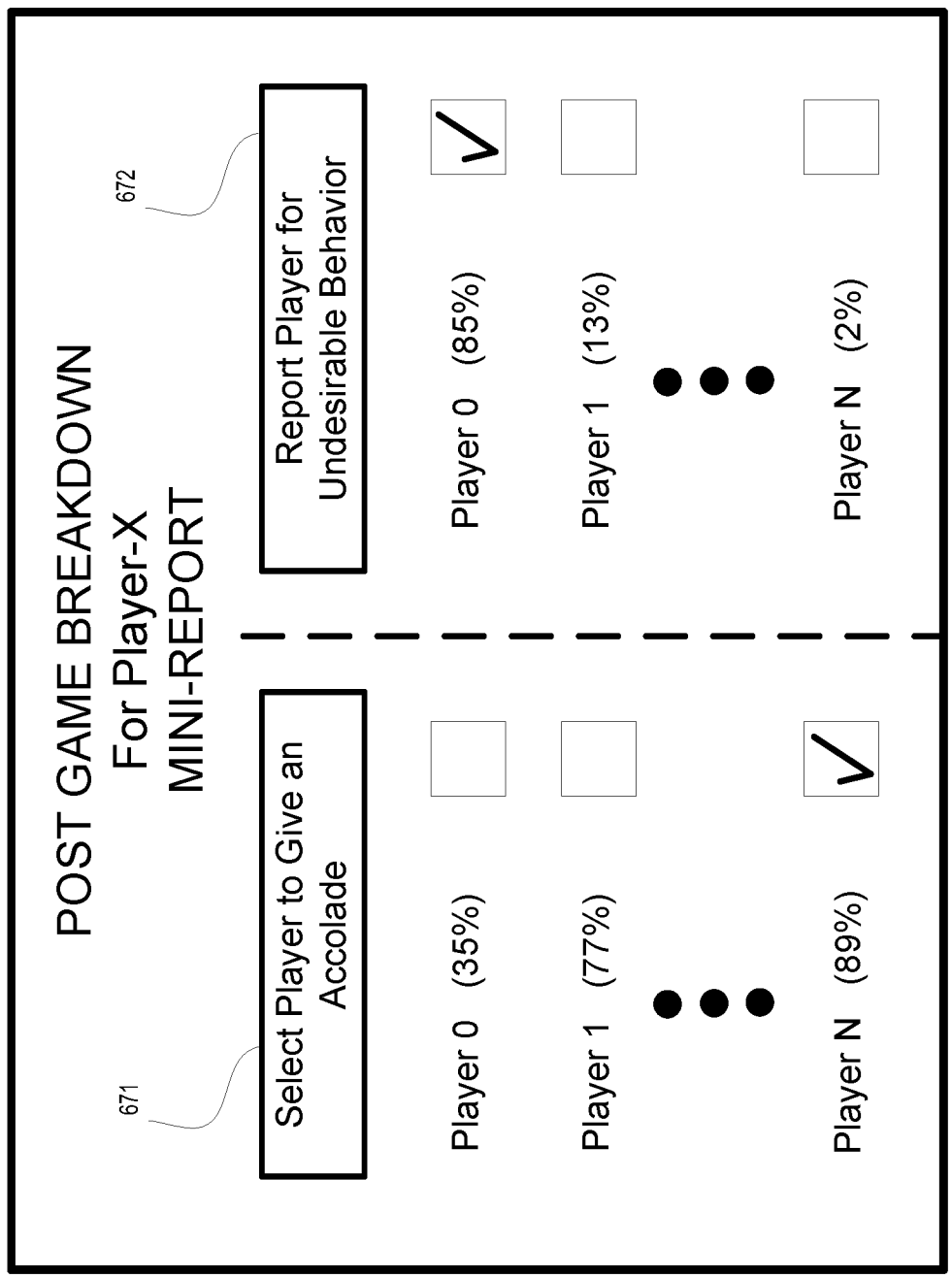

CLASSIFYING GAMING ACTIVITY TO IDENTIFY DESIRABLE BEHAVIOR

CLAIM OF PRIORITY

This application is a continuation of and claims priority to and the benefit of commonly owned, U.S. patent application Ser. No. 16/945,568, filed on Jul. 31, 2020, entitled "Classifying Gaming Activity To Identify Abusive Behavior"; the disclosure of which is incorporated herein in its entirety for all purposes.

TECHNICAL FIELD

The present disclosure is related to online gaming, and more specifically to the classification of online gaming activity using artificial intelligence to identify abusive behavior that potentially and negatively impacts the gaming experience of other players.

BACKGROUND OF THE DISCLOSURE

Video games and their related industries (e.g., video gaming) represent a large percentage of the worldwide entertainment market, with some projections having video game global revenues exceeding revenue from the movie industry in the near future. The kids growing up playing video games are now adults (young and old) influencing where their entertainment moneys are to be spent—in the world of video game entertainment.

Video games are played anywhere and at any time using various types of platforms, including gaming consoles, desktop computers, laptop computers, mobile phones, etc. Once a niche market directed to a small number of children and young adults, video games have become increasingly popular across generations, and over time has become an important part of popular culture.

In recent years there has been a continual push for online services that allow for online or cloud gaming in a streaming format between a cloud gaming server and a client connected through a network. The streaming format has increasingly become more popular because of the availability of game titles on demand, the ability to network between players for multi-player gaming, sharing of assets between players, sharing of instant experiences between players and/or spectators, allowing friends to watch a friend play a video game, having a friend join the on-going game play of a friend, and the like.

Multi-player gaming relies on inter-personal interactions between players. For example, when playing some game titles team members communicate with each other to formulize a strategy during a gaming session, and cooperatively play together in order to achieve a goal, such as beating another team, winning a target, achieving a goal, etc. The comradery between players experienced during these online gaming sessions is not unlike that for other team oriented endeavors, such as in business, sports, social settings, etc.

In addition, each of the game titles may be associated with a corresponding online gaming community that is formed through playing the game titles and through other social platforms dedicated to online gaming (e.g., communication forums). For example, players that frequently play a certain game title may be known to each other and to other spectators through their online gaming personas. Players become aware of the accomplishments of other players, such as through communication during gaming sessions, or through the other online social platforms (e.g., chat, forums, streaming channels, etc.) that may be directed to the game play of one or more gaming titles. As such, players may achieve a reputation within the online gaming community that may span from good to bad, just as in any social community. A player's reputation may become important within the online gaming community, as other players may want to form friendships with that player, to emulate that player, or seek to avoid that player based on the corresponding reputation for purposes of social interactions or gaming.

In some cases, popular players within the online gaming community may gain a devoted following of other players and/or spectators. These popular players may stream their recorded game plays that are posted to streaming platforms to be available to their fans at any time. The most popular players may take advantage of revenue streams made possible through their reputation in the online gaming community, such as through sponsorships, or advertisements connected with their streaming game plays, etc. In addition, an online gaming community may span across multiple game titles. For example, a player may be good at and therefore possibly popular across many gaming titles, in which case that player is able to expand the online gaming community across one or more gaming titles.

The gaming experience of each player is paramount for the success of a corresponding game title and for the overall gaming industry. When the gaming experience is enjoyable, many players have been known to repeatedly return to play the same game title for many years. Also, when the gaming experience of a player continues to be enjoyable, that player may decide to play other gaming titles. However, sometimes the gaming experience of players is not as enjoyable as desired. In those cases, a player that does not have an enjoyable gaming experience over one or more gaming sessions may decide not to play a particular gaming session, may decide to quit playing a specific game title, and ultimately decide generally to quit playing online gaming titles. Even though the number of players that may not have enjoyable gaming experiences is relatively small, the negative impact on the gaming industry may grow over time so that the growth of the industry may become stagnant or regressive, especially if the underlying issues are not addressed.

A player's enjoyment when playing an online game title may be negatively impacted through any number of interactions with certain other players. In particular, some of these other players are purposefully performing undesirable actions and/or activities (e.g., acting in an abusive manner or exhibiting abusive behavior) that degrade the gaming experience of one or more other players. Generally, these players can be referred to as "abusers," though they may be known by other terms, such as toxic players, bullies, griefers, etc. and are known to enjoy causing grief to other players and/or to disrupt the gaming experience of other players.

In some cases, an abuser is directing his or her abusive behavior towards one or more players that are targets of opportunity. For example, the abusive behavior of the abuser may be directed to one or more players that were randomly assigned to same team as the abuser. In other cases, an abuser is seeking out specific players in an effort to diminish their gaming experience. For example, an abuser may be targeting players that fall within marginalized groups within the online community, such as those groups identified through age, gender, race, sexual orientation, gaming experience, etc. Further, an abuser may target a player for other seemingly random reasons, such as not liking their online name or persona, find that player annoying, not liking the look of an avatar, not liking how an avatar is outfitted, not liking the color of an outfit, etc.

Abusive behavior may range from being mildly annoying to bordering on and even crossing over to bordering on illegal or criminal activity. Clearly abusive behavior includes harassment, bullying, cheating, griefing, etc. In general, abusive behavior includes behavior that is intended to negatively affect the enjoyment of game play of another player. Though abusive behavior may be clear and evident, in many cases the abusive behavior may be less distinct, such that possibly more complex abusive behaviors and/or actions may exist within online gaming that are difficult to detect.

There may be a feeling of indifference or inevitability towards abusers within the online gaming community. For example, the number of abusers is still relatively small and most players do not experience any level of abusive behavior. Also, previously abusers may be able to act without consequence, as there were minimal if any remedial actions taken against abusers, even if targeted players and/or victims reported the abusive behavior to gaming hosts. However, the gaming industry is awakening to the negative problems presented with having abusers in an online gaming community. Progressively, there may be an ultimate price to pay if abusive behavior is left unchecked. For example, the online gaming community may see a reduction in numbers as the community evolves to being more caustic and accepting of abusive behavior.

It is in this context that embodiments of the disclosure arise.

SUMMARY

Embodiments of the present disclosure relate to systems and methods for training and implementing an artificial intelligence (AI) model that is configured to identify activities controlled by players of a video game as being undesirable or desirable. The AI model is trained using a deep learning engine configured to extract features related to activities of the players and to classify those activities as being abusive behavior or being desirable (e.g., good behavior). In that manner, additional actions may be performed to help build an online gaming community that curbs abusive behavior.

In one embodiment, a method for controlling online gaming behavior is disclosed. The method including monitoring at a game server a plurality of game plays of a plurality of players playing a video game in a gaming session over a period of time. The method including extracting features from the plurality of game plays related to a plurality of activities associated with the plurality of game plays, the plurality of activities being controlled by the plurality of players. The method including running the features through an artificial intelligence (AI) learning model configured to classify the plurality of activities. The method including classifying an activity as abusive behavior.

In another embodiment, a non-transitory computer-readable medium storing a computer program for implementing a method for controlling online gaming behavior is disclosed. The computer-readable medium including program instructions for monitoring at a game server a plurality of game plays of a plurality of players playing a video game in a gaming session over a period of time. The computer-readable medium including program instructions for extracting features from the plurality of game plays related to a plurality of activities associated with the plurality of game plays, the plurality of activities being controlled by the plurality of players. The computer-readable medium including program instructions for running the features through an artificial intelligence (AI) learning model configured to classify the plurality of activities. The computer-readable medium including program instructions for classifying an activity as abusive behavior.

In still another embodiment, a computer system is disclosed, wherein the computer system includes a processor and memory coupled to the processor and having stored therein instructions that, if executed by the computer system, cause the computer system to execute a method for controlling online gaming behavior is disclosed. The method including monitoring at a game server a plurality of game plays of a plurality of players playing a video game in a gaming session over a period of time. The method including extracting features from the plurality of game plays related to a plurality of activities associated with the plurality of game plays, the plurality of activities being controlled by the plurality of players. The method including running the features through an artificial intelligence (AI) learning model configured to classify the plurality of activities. The method including classifying an activity as abusive behavior.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 6C illustrates a data flow diagram illustrating the verification of undesirable behavior flagged by a player, in accordance with one embodiment of the disclosure.

FIG. 6H illustrates a mini reporting feature 600H that provides for quick acknowledgment of undesirable behavior and/or desirable behavior, in accordance with one embodiment of the disclosure.

DETAILED DESCRIPTION

Figure 1:
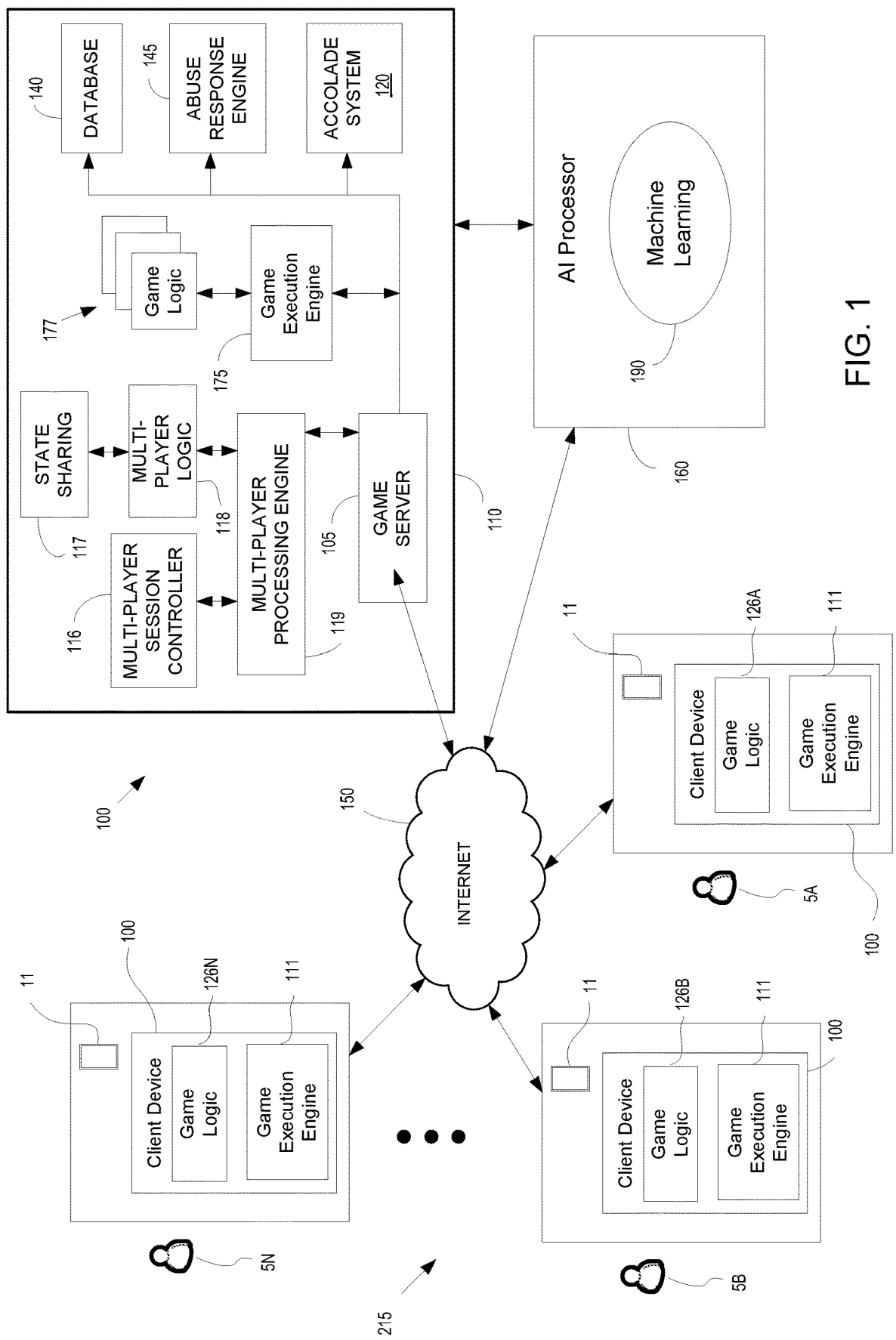
FIG. 1 illustrates a system configured to implement an artificial intelligence model that is configured to identify undesirable and/or desirable activities that are controlled by players of a video game during a gaming session, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing artificial intelligence (AI) techniques to train and/or build a machine learning model configured to identify and/or classify undesirable behavior among players of a gaming session and the application of mitigation techniques in an effort to minimize occurrences of the undesirable behavior. Further, the machine learning model may be configured to identify desirable behavior among players of a gaming session, for purposes of establishing and building reputations of players within an online gaming community, such as through a system providing accolades to players performing desirable behavior. In particular, embodiments of the present disclosure are configured to classify abuses by others (e.g., abusive behavior). Other embodiments are configured to identify when players decide to quit because of abuses in the game. Some examples of abuses or abusive behavior performed by one or more players (e.g., abusers) include "intentionally killing his or her own character" to hurt their group (e.g., team of players in a multi-player game) or their friends; intentionally killing a teammate; spamming with emoticons; "griefing" to perform actions that are intended to cause grief to another player; deciding to not help teammates on a team; watching another character die; watching a teammate's character die without rendering assistance; watching a teammate's character experience hardship or issues without rendering assistance, etc. in embodiments of the present disclosure. In an effort to mitigate abusive behavior, at the end of a gaming session, instead of just showing game scores, the statistics could include identification of abusers or abusers that showed certain characteristics (e.g., undesirable behavior), in an embodiment of the present disclosure. Additional actions can be taken in an effort to mitigate the undesirable behavior, including warning the identified player performing the undesirable behavior, banning the identified player X number of sessions, placing the identified player in a timeout during a current gaming session, etc. In other embodiments, it is also possible to use artificial intelligence (e.g., a machine learning model) to monitor session activity and learn what is bad (undesirable behavior) and good (e.g., desirable behavior). Telemetry data (e.g., game state data, metadata, and user save data) can be captured during game play for each player, and that telemetry data can be processed to identify players as possible abusers. In other embodiments, crowd sourcing can be used to verify activity as abusive or not, and those verifications can be fed back to the artificial intelligence system implementing machine learning to provide additional training and/or learning to a machine learning module configured to identify undesirable and desirable behavior by players during gaming sessions. In embodiments of the present disclosure, the abused player (e.g., targeted player and/or victim) does not have to change his or her pattern of gaming, such as when the corresponding abuser is banned from the gaming session or from entirely playing the video game (e.g., lifetime ban).

Advantages of a system configured to identify and/or classify behavior of players in one or more gaming sessions include the efficient implementation of a cloud gaming system. For example, undesirable and/or abusive behavior may cause back-end servers to have a negative cost in terms of processing power and cycles. That is, the undesirable and/or abusive behavior during one or more gaming sessions utilize processing resources. Computing resources are lost for actions occurring in the video game that are not helpful towards the advancement of a video game. Also, executing actions relating to undesirable and/or abusive behavior may cause bottlenecks if too many people are exhibiting undesirable and/or abusive behavior. That is, that undesirable and/or abusive activity could slow down the system to the detriment of other players (e.g., causing delays in their associated processing of corresponding game plays) that are trying to play the game legitimately, or trying to advance the game. Basically, using computing resources for handling undesirable and/or abusive player activity would put a strain on the processing systems, memory, storage, etc. In addition, handling undesirable and/or abusive player activity would cause additional management resources to be used that could potentially take away from processing actual game activity, such as by causing extra reporting on the game play involving undesirable and/or abusive activity, and additional traffic management to manage the traffic and/or reduce the behavior. As a result, the detection and classification of undesirable (e.g., abusive, bad, etc.) behavior may allow for the application of mitigation techniques that increases the efficiency of the cloud gaming system. In particular, restriction on game play of players that exhibit undesirable behavior may be enforced (e.g., placing those players in timeout sessions, or banning the player for a period of time). This leads to increased bandwidth of the cloud gaming system that is available for constructive game play during one or more gaming sessions, as players exhibiting undesirable behavior are prevented from taking up valuable bandwidth, and targets of the undesirable behavior need not waste time and effort in their game play to address undesirable behavior. Instead, the game play of targets of undesirable behavior can be directed in an efficient manner to advance their corresponding game play. As such, there is more bandwidth for constructive game play, as resources are no longer handling or mitigating activity related to undesirable and/or abusive behavior.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

With the above general understanding of the various embodiments, example details of the embodiments will now be described with reference to the various drawings.

FIG. 1 illustrates a system 100 configured to implement an artificial intelligence model using artificial intelligence (e.g., through application of machine learning) that is configured to identify undesirable and/or desirable activities that are controlled by players of a video game during a gaming session, in accordance with one embodiment of the disclosure. Once the undesirable and/or desirable activities of players are identified, additional responses may be performed by the system 100 in order to promote and/or give credence to acting with good behavior when playing an online video game. For example, an abuse response engine 145 is configured to mitigate abusive behavior of a corresponding player once that abusive behavior is identified using artificial intelligence. Also, an accolade system 120 is configured to promote the overall wellness of the online gaming community by managing accolades (e.g., issuing and removing), wherein an accolade may be representative of positive affirmation between players.

The video game may be executing locally to a corresponding player (without back-end support as a stand-alone system, or with back-end support for data transfer and storage or in a multi-player setting), or may be executing at a back-end server (e.g., through game cloud system 110), as will be described below. As shown, a plurality of players 115 (e.g., player 5A, player 5B . . . player 5N) is playing a plurality of video games or gaming applications, wherein each of the video games is executed locally on a corresponding client device 100 (e.g., game console) of a corresponding user, or on a back-end server (e.g., game cloud system 110). The system 100 supports game play by the plurality of players 115 at one or more moments in time in single-player or multi-player modes, such as over a period of time. In addition, each of the plurality of players 115 has access to an optional device 11 or other device (e.g., speaker or head mounted display), configured to provide additional support (e.g., display, etc.) and/or features. Client device 100 can include any type of device having a processor and memory, wired or wireless, portable or not portable. In one embodiment, client device 100 can be in the form of a smartphone, a tablet computer, or hybrids that provide touch screen capability in a portable form factor.

For local execution of a corresponding video game, each of the client devices 100 may be configured similarly in that local execution of a corresponding gaming application is performed. For example, player 5A may be playing a first video game on a corresponding client device 100, wherein an instance of the first video game is executed by a corresponding game execution engine 111 (e.g., game engine) including a central processing unit (CPU) and graphics processing unit (GPU) group. Game logic 126A (e.g., executable code) implementing the first video game is stored on the corresponding client device 100, and is used to execute the first video game using the game execution engine 111. For purposes of illustration, game logic may be delivered to the corresponding client device 100 through a portable medium (e.g., flash drive, compact disk, etc.) or through a network (e.g., downloaded through the internet 150 from a gaming provider). In addition, player 5B is playing a second video game on a corresponding client device 100, wherein an instance of the second video game is executed by a corresponding game execution engine 111. The second video game may be identical to the first video game executing for player 5A or a different video game. Game logic 126B (e.g., executable code) implementing the second video game is stored on the corresponding client device 100 as previously described, and is used to execute the second video game using a corresponding game execution engine 111. Further, player 115N is playing an Nth video game on a corresponding client device 100, wherein an instance of the Nth video game is executed by a corresponding game execution engine 111. The Nth video game may be identical to the first or second video game, or may be a completely different video game. Game logic 126N (e.g., executable code) implementing the third video game is stored on the corresponding client device 100 as previously described, and is used to execute the Nth video game using a corresponding game execution engine 111.

For remote execution of a corresponding video game, game cloud system 110 may be configured as a distributed game server system and/or architecture. Generally speaking, game cloud system (GCS) 110 may be a cloud computing system operating over a network 150 to support a plurality of users/players. GCS 110 is a system that can provide gaming applications, services, gaming related digital content, and interconnectivity among systems, applications, users, and social networks. GCS 110 may communicate with client devices 126A-N and social media providers (not shown) through social media manager (not shown) via network interface (not shown). A social media manager (not shown) may be configured to relate one or more friends across one or more social media platforms. A gaming session manager (not shown) of the GCS 110 may communicate with a recording engine (not shown) to generate or save a recording (e.g., video) of game play or game play session, or gaming session.

User profiles for each player accessing the GCS 110 includes player information that can be used for authentication purposes and/or identifying undesirable or desirable behavior. For example, an account manager (not shown) may be used to update and manage user information related to a member user/player. User profiles may be stored in database 140.

The plurality of players 115 accesses the game cloud system 110 via network 150, wherein players (e.g., players 5L, 5M . . . 5Z) access network 150 via corresponding client devices 100, wherein each client device 100 may be configured with a game executing engine 111 configured to execute game logic, or may be configured as a thin client that interfaces with a back end server providing computational functionality (e.g., including game executing engine 175 configured to execute game logic 177), such as in a streaming configuration. In that manner, game play is primarily executed in the GCS 110, such that a corresponding client device 100 will receive a stream of game video frames from GCS 110, and user input commands for driving the game play can be transmitted back to the GCS 110. In particular, a client device 100 of a corresponding player 5A is configured for requesting access to gaming applications over a network 150, such as the internet, and for rendering instances of a video game executed by the game server 105 and delivered to a display device associated with the corresponding player 5A. For example, player 5A may be interacting through client device 100 with an instance of a video game executing on game processor of game server 105. More particularly, an instance of the gaming application is executed by the game execution engine 175. Game logic (e.g., executable code) implementing the video game is stored and accessible through data store or database 140, and is used to execute the video game. Game execution engine 175 is able to support a plurality of video games using a plurality of game logics 177.

As shown, the game cloud system 110 includes a game server 105 that provides access to a plurality of interactive video games or gaming applications. Game server 105 may be any type of server computing device available in the cloud, and may be configured as one or more virtual machines executing on one or more hosts. For example, game server 105 may manage a virtual machine supporting a game processor that instantiates an instance of a gaming application for a user. As such, a plurality of game processors of game server 105 associated with a plurality of virtual machines is configured to execute multiple instances of one or more video games associated with game plays of the plurality of users 115. For example, the game cloud system 110 may include a plurality of virtual machines (VMs) running on a hypervisor of a host machine, with one or more virtual machines configured to execute a game processor module utilizing the hardware resources available to the hypervisor of the host. In that manner, back-end server support provides streaming of media (e.g., video, audio, etc.) of game plays of a plurality of video games to a plurality of corresponding users.

In particular, in the distributed game server system a distributed game execution engine executing game logic is configured as a corresponding instance of a corresponding video game. In general, the distributed game execution engine takes each of the functions of a game execution engine and distributes those functions for execution by a multitude of processing entities functioning as a central processing unit (CPU) and graphics processing unit (GPU) group. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the game cloud system, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the video game in response to controller input by a player. The distribution synchronization layer is able to efficiently execute (e.g., through load balancing) those functions across the distributed processing entities, such that critical game engine components/functions are distributed and reassembled for more efficient processing.

System 100 provides gaming control to the plurality of players 115 (e.g., players 5A-5N), such that each of client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 105 over network 150. Also, client device 100 of a corresponding player is configured for generating rendered images executed by the game execution engine 111 executing locally or executed by game execution engine 175 executing remotely, and for displaying the rendered images on a display. For example, the rendered images may be associated with an instance of a corresponding video game executing locally on the client device 100 of a corresponding player, or the client device 100 is configured to interact with an instance of a corresponding video game executing remotely via game server 105 to implement a game play of a corresponding player, such as through input commands that are used to drive game play.

In one embodiment, client device 100 is operating in a single-player mode for a corresponding player that is playing a video game. In another embodiment, multiple client devices 100 are operating in a multi-player mode for corresponding players that are each playing a specific video game. In that case, back-end server support via the game server 105 may provide multi-player functionality, such as through the multi-player processing engine 119. In particular, multi-player processing engine 119 is configured for controlling a multi-player gaming session for a particular gaming application. For example, multi-player processing engine 119 communicates with the multi-player session controller 116, which is configured to establish and maintain communication sessions with each of the users and/or players participating in the multi-player gaming session. In that manner, players in the session can communicate with each other as controlled by the multi-player session controller 116.

In particular, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database or datastore 140, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user when playing the game, game level, character attributes, character location, number of lives left, the total possible number of lives available, armor, trophy, time counter values, etc. User saved data may also include user profile data that identifies a corresponding player, for example. User saved data may be stored in database 140.

In addition, state data may include metadata that is configured to provide information and/or context to other information, such as the game state data and the user saved data. Metadata may provide relational connections between different information, or provide any type of useful information. For example, metadata may include information describing the gaming context of a particular point in the game play of a player, such as where in the game the player is, type of game, mood of the game, rating of game (e.g., maturity level), the number of other players there are in the gaming environment, game dimension displayed, the time of the collection of information, the types of information collected, region or location of the internet connection, which players are playing a particular gaming session, descriptive information, game title, game title version, franchise, format of game title distribution, network connectivity, downloadable content accessed, links, language, system requirements, hardware, credits, achievements, awards, trophies, etc.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

Back-end server support via the game server 105 may provide additional features, such as implementing an abuse response engine 145 and an accolade system 120. In particular, game server 105 may work cooperatively with the AI processor 160 in order to identify and or classify undesirable and/or desirable behavior of players in one or more gaming sessions of one or more video games using artificial intelligence. As such, GCS 110 is configured to identify undesirable behavior (e.g., abusive behavior and/or behavior intentionally designed to reduce the enjoyment of a gaming experience of one or more other players—e.g., targeted players and/or victims) of players within one or more gaming sessions of one or more video games, and to provide additional responses and/or reactions in order to mitigate the undesirable behavior using the abuse response engine 145. Further, GCS 110 is configured to identify desirable behavior (e.g., good behavior that generally increases the enjoyment of a gaming experience of one or more other players), and to manage a system of accolades in order to promote the practicing of good behavior by players when playing online video games. One or more user/player devices may be connected to network 150 to access services provided by GCS 110 and social media providers (not shown).

For example, AI processor 160 is configured to implement a machine learning engine 190 (e.g., through a machine learning model) in order to identify and/or classify undesirable behavior by a player within a gaming session, such as abusive behavior, in accordance with one embodiment of the disclosure. After identifying and/or classifying the abusive behavior, the abuse response engine 145 is configured to provide additional system responses and/or actions that are designed to mitigate the abusive behavior of the corresponding player in the short term, and in the long run.

In another example, AI processor 160 is configured to implement a machine learning engine 190 applying machine learning (e.g., through a machine learning model) in order to identify and/or classify desirable behavior by a player within a gaming session, in accordance with one embodiment of the disclosure. The desirable behavior may include good behavior that promotes the overall wellness of an online gaming community and that generally beneficially increases the gaming experience (e.g., enjoyment) of one or more ore other players. After identifying the desirable behavior, the accolade system 120 is configured to promote the wellness of an online gaming community through the management of accolades for members of the online gaming community. An accolade may be a metric of positive affirmation of player behavior as regulated between players or by the accolade system 120. In particular, accolades that are given and/or taken away provide a representation of a reputation of a corresponding player, wherein the reputation may indicate how beneficial the player is within the community. For example, a player that continually performs actions that increase the enjoyment of another player (e.g., helps a beginning or inexperienced player through a gaming session) may have a reputation as represented through a high number of accolades or high accolade rating. In a specific implementation, one player may give another teammate (e.g., player) an accolade, which represents a metric of an express positive affirmation during a post-game wrap-up session. Players can give one accolade per gaming session to any other player. In some cases, players can give one or more accolades per gaming session. In one embodiment, the accolade is given anonymously. In another embodiment, the receiver is aware of the player giving an accolade.

Accolade System

Figure 2:
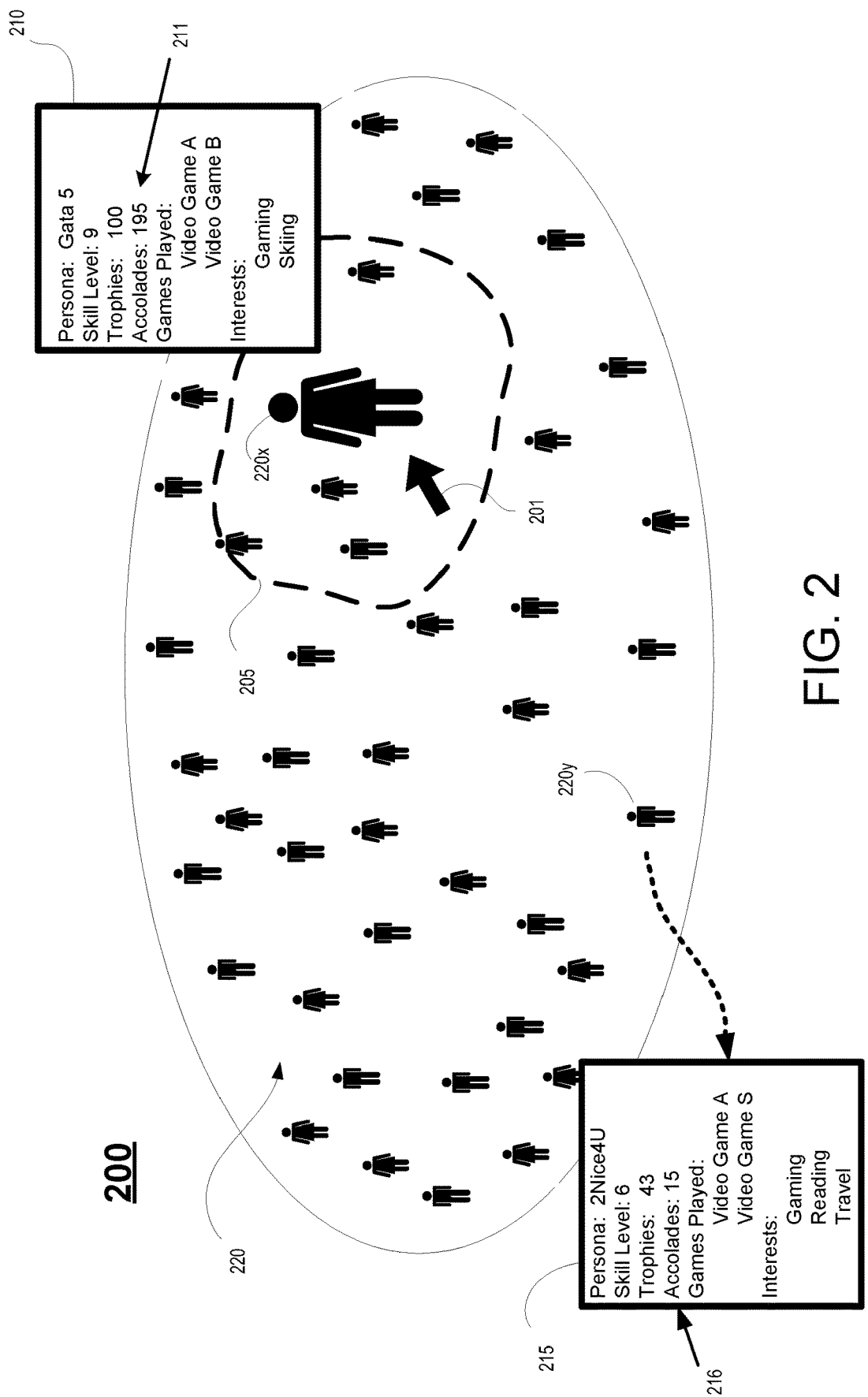
FIG. 2 is an illustration of an online gaming community, in accordance with one embodiment of the disclosure.

FIG. 2 is an illustration of an online gaming community 200, in accordance with one embodiment of the disclosure. The online gaming community 200 includes a plurality of members 220, wherein community 200 may be a universal community that encompasses many types of members. Generally, a member of the community 200 has some interest in gaming, or for a particular video game, or for a set of video games. For example, members may be players, spectators, casual observers, intense observers, researchers, pundits, social commentators, business partners, etc.

As shown, the online gaming community 200 may include one or more subsets, wherein each subset may include one or more members. For purposes of illustration, community subset 205 includes multiple members taken from the plurality of members 220, each of which may be represented by a corresponding avatar representation. The avatars may be generic or customized by each member. The community subset 205 includes member 220x that is enlarged and highlighted by the placement of cursor 201 near to the player. Each member of the community subset 205 has a common and related interest related to gaming. For example, community subset 205 may be related to a particular video game, wherein the video game may be a single player, multi-player, massively multi-player (MMO), first person shooter, etc. Members of the community subset 205 may be passionate about the video game, and may either play the video game, actively spectate the video game, want to learn about the game, have friends within the subset 205, other interests, or have any combination of the previous. The community subset 205 may include a social network of friends or other relatable groups of users. Members may interact with each other within the universal community 200, within a particular community subset, or between community subsets.

In some cases, the community subset 205 could exist over a long period of time, such as a period that spans multiple gaming sessions of one or more video games. For example, community subset 205 may include a group of friends that form a team when playing video game X, wherein the team players may be online at the same time, or participate over disjointed timelines (e.g., at different times and not online at the same time) in order to collaboratively achieve objectives. In other cases, the subset could exist over a much shorter period of time, such as a period that spans a single gaming session. In that case, a group of players that form the community subset 205 may be randomly configured as a team, or the group of players that form the community subset 205 may be a group of friends playing as a team.

Online gaming community 200, or any of the community subsets, may be formed by social constructs that apply to society in general, but may also take on social constructs that are unique to gaming. For purposes of simplicity and illustration only, the following concepts are described in relation to the online gaming community 200, but is equally applicable to any of the community subsets. Just as within any social community, the online gaming community 200 may include members that considered to be normal, to be of good standing, to be well respected, and to be of poor standing within the community. For example, member 220x may be considered as a player of good standing, one that uses his or her corresponding skill set properly and without intention to harm other players, and one that generally is concerned with the welfare of community 200 and/or its members. The user profile 210 of player 220x that may be visible to other members when highlighted (e.g., using a cursor 201) may include various pieces of information, such as: persona (Gata 5); skill level (9 out of 10); trophies (100); accolades (195) as entry 311; games played (Video Game A, Video Game B, etc.); and interests (gaming, skiing, etc.).

On the other end of the spectrum, player 220y may be considered as a player of poor standing. As shown, player 220y is not part of the community subset 205, but may be part of the community. Player 220y may be considered as a player who generally is unconcerned with the welfare of the community 200, a corresponding community subset, and/or its respective members. Player 220y may act in a manner that is disruptive to one or more other members, and to the overall community 200 or a community subset. The user profile 215 of player 220y is shown for ease of description but has not necessarily been selectively highlighted in FIG. 2 by another player, and may include various pieces of information, such as: persona (2Nice4U); skill level (6 out of 10); trophies (43); accolades (15) as entry 316; games played (Video Game A, Video Game S, etc.); and interests (gaming, reading, travel, etc.).

In one embodiment, a system of accolades is implemented within the online gaming community 200 in order to promote the well-being of the community, or for other purposes. An accolade may be a metric of express positive affirmation that is given to one player by another player anonymously or transparently, wherein one player recognizes or is giving recognition for the good behavior of another player. An accolade may also be given by the system managing the online gaming community 200. The system and/or the players can give one or more accolades per gaming session. The number of accolades that a player collects may build up a reputation within the online gaming community 200, or within a community subset. As such, the accolade system may be implemented for purposes of establishing and building reputations of players within an online gaming community, such as through a system providing accolades to players performing desirable behavior. A player's reputation may indicate how beneficial the player is within the community. For example, a player that continually performs actions that increase the enjoyment of another player (e.g., helps a beginning or inexperienced player through a gaming session) may have a reputation as represented through a high number of accolades or high accolade rating. Accolades, accolade points, or accolade tokens may be increased through the practice of desirable behavior, but also may be decreased through the practice of undesirable behavior.

For example, the well-being of the community may be nurtured by providing a trusted and safe environment for members of the community through the use of accolades. That is, the use of accolades may direct and/or nudge players of the community to act using behavior that is desired, such as acting in a manner that provides a trusted and safe environment for members of the community 200 or a subset therein. As previously described desirable behavior by a player may promote the enjoyment of a gaming experience for another player. For purposes of illustration only, desirable behavior may also be referred to as "good" behavior. Further, good behavior may be promoted by the service supporting the online gaming community. In one embodiment, accolades may be used to promote the practice of desired behavior by players within the community, wherein a player that is behaving in a desired manner may be the recipient of one or more accolades from one or more other players. As such, players may wish to increase their reputation (e.g., as being respected, as being a good citizen, etc.) within the community as represented by their increasing corresponding number of issued accolades or accolade points or tokens by acting using desirable behavior. In some cases, players with high levels of accolades may be of such good standing as to become influencers within the online gaming community 200, such that other players may wish to emulate those influencers by exhibiting desirable behavior (e.g., good behavior, etc.) In FIG. 2, player 220x may be a player with a good reputation, as indicated by a high number of accolades and/or accolade points earned (e.g., higher than 150 accolades). A high skill level may not necessarily indicate whether a player has a good or bad reputation within the online gaming community 200.

Some examples of desirable behavior may include: using positive language during a gaming session; providing positive affirmation of another player or teammate; providing aid to a teammate that goes beyond what is normally done; providing help to an inexperienced player; activities that enable teamwork between players; the positive engagement of a player, etc.

On the other hand, undesirable behavior by a player may diminish the gaming experience (e.g., reduce enjoyment) for another player or players. For purposes of illustration only, undesirable behavior may also be referred to as "bad" behavior. For example, a player that practices undesirable behavior may be dissuaded by the service supporting the online gaming community, such as through the use of an accolade system, wherein a player that is behaving badly (e.g., in an undesired manner) may have their total number of accolades reduced for each corresponding activity that is considered to be bad behavior. In particular, players may wish to maintain and/or increase their reputation within the community by not acting in a manner that reduces their corresponding number of collected accolades. That is, a player exhibiting undesirable behavior may have their reputation tarnished, as their corresponding number of collected accolades is reduced. In addition, players that have behaved badly may wish to offset that bad behavior by acting using good behavior that invites the giving of accolades, i.e., the player may rebuild his or her reputation. In one embodiment, the system managing the online community 200 reduces the number of accolades, or accolade points or tokens of a player, when that player is identified as having behaving badly. In FIG. 2, player 220y may be a player with a good reputation, as indicated by a low number of accolades and/or accolade points earned (e.g., lower than 30 accolades). A high skill level may not necessarily indicate whether a player has a good or bad reputation within the online gaming community 200.

As previously described, some examples of undesirable behavior may be considered abusive and/or causing grief. The players performing that type of abusive or griefing behavior may be labeled as "abusers" for purposes of this application, wherein other labels may also represent those types of player, such as toxic players, griefers (player causing grief to another player), etc. There may be levels of undesirable behavior, wherein abusive behavior may be more negative than griefing. Some examples of undesirable behavior which may be considered abusive include "intentionally killing his or her own character" to hurt their group (e.g., team of players in a multi-player game) or their friends; intentionally killing a teammate; spamming with emoticons; "griefing" to perform actions that are intended to cause grief to another player; deciding to not help teammates on a team; watching another character die; watching a teammate's character die without rendering assistance; watching a teammate's character experience hardship or issues without rendering assistance, etc. in embodiments of the present disclosure.

In one embodiment, an artificial intelligence (AI) learning model can be configured to learn and/or classify desirable and undesirable behavior (e.g., activity, actions, etc.) among one or more players of a gaming session. In one embodiment, the AI learning model is a machine learning model configured to apply machine learning to classify behavior of players. In another embodiment, the AI learning model is a deep learning model configured to apply deep learning to classify behavior of players. The AI learning model is further described in relation to FIG. 4.

In some embodiments, accolades are weighted based on the type of game that is being played. For example, one particular video game may provide an environment that is conducive for earning and/or giving out accolades between players, wherein everyone generally does well and thoroughly enjoys playing the video game (i.e., one where accolades are easily earned). That is, no one person is left out. Players participating in that video game may feel inclined to freely give out accolades (e.g., everyone gets an accolade when playing a carnival game). In that case, the accolades may be weighted lower (e.g., having a low weight multiplier). An activity that exhibits desirable behavior may end up issuing half of an accolade point that is added to the total number of accolade points. On the other hand, another video game may provide an environment that is very difficult for earning and/or giving accolades between players, such as when playing an intense strategy game. Even though everyone may enjoy playing the video game, most players are struggling to survive the gaming session as the video game may be difficult to play. In that case, the accolades may be weighted higher (e.g., having a high weight multiplier). For example, an activity that exhibits desirable behavior may end up issuing one and a half accolade points that are added to the total number of accolade points.

In one embodiment, accolades represent a metric of express, positive affirmation and can be given during a post-game session that occurs after a team of players finishes playing a gaming session of a video game. In other embodiments, an accolade can be given during game play of a gaming session. In that manner, the game play or flow of the game play in a particular gaming session is not interrupted. Some examples of post-game sessions include post-game or post-mission briefings and/or breakdowns. For example, after a gaming session, each player on a team is given one accolade to give to any other player (e.g., a teammate or a player on another team). In other embodiments, players have an opportunity to give out an accolade after a period (e.g., time, gaming session, etc.). As previously described, an accolade may be given anonymously, or may be given transparently, such that that receiving player knows who sent the accolade.

Figure 3A:
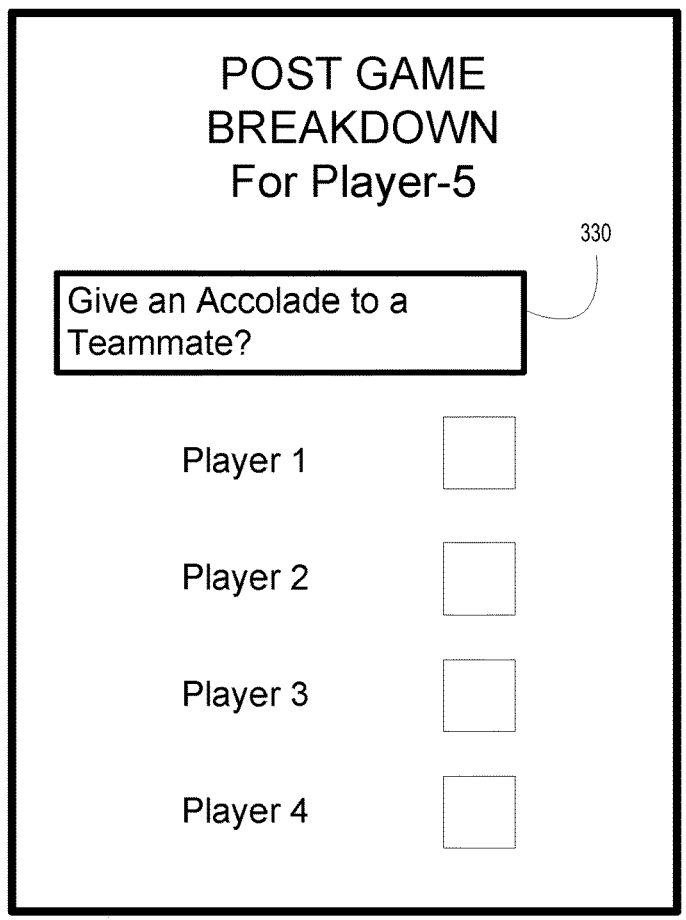
FIG. 3A is an illustration of a notification providing for the giving of an accolade to a teammate, in accordance with one embodiment of the disclosure.

FIG. 3A is an illustration of an accolade interface 300A configured to allow a player to give an accolade to a teammate or to another general player, such as to recognize performance of an action and/or activity that exhibits desirable behavior, such as behavior that is beneficial to the online gaming community, or more particularly behavior that increases the enjoyment of corresponding gaming experiences of one or more other players. As shown, the accolade interface may be presented to player-5 during a post-game breakdown session, wherein player 5 is part of a team of players participating in game plays of a video game during a gaming session. The team of players may include players 1 to 5. Accolade interface 300A provides a way to give an accolade from one player on the team to another player on the team after the gaming session. As shown, player 5 is given the option to send an accolade to any teammate (e.g., players 1 through 4) by selecting the player in a corresponding check box. The accolade interface 300A may be provided as a pop-up without any request from player 5, and is presented to player 5 after the gaming session has ended, in one embodiment. In that manner, the giving of an accolade may be frictionless. Further, the accolade may be sent directly with the selection of a receiving player, without any further interaction by player-5, in one embodiment. In other implementations, player-5 may select another button or icon to send the accolade, after selection of the receiving player is made. For example, after selection of a player to receive an accolade, player-5 may select box 330 to initiate and complete the sending of the accolade.

Figure 3B:
FIG. 3B is an illustration of a notification informing a player of the receipt of an accolade, in accordance with one embodiment of the disclosure.

FIG. 3B is an illustration of a notification 300B informing a receiving player of the receipt of an accolade, in accordance with one embodiment of the disclosure. For example, notification 300B may be provided as a message, or a pop-up message, to player-X indicating that an accolade was given anonymously. In other implementations, the sender of the accolade may also be indicated to the receiving player-X. Notification 300B may be given at any time, such as in real-time as the when the accolade is given, or may be presented at another time, such as after a delay after the accolade is given.

Figure 3C:
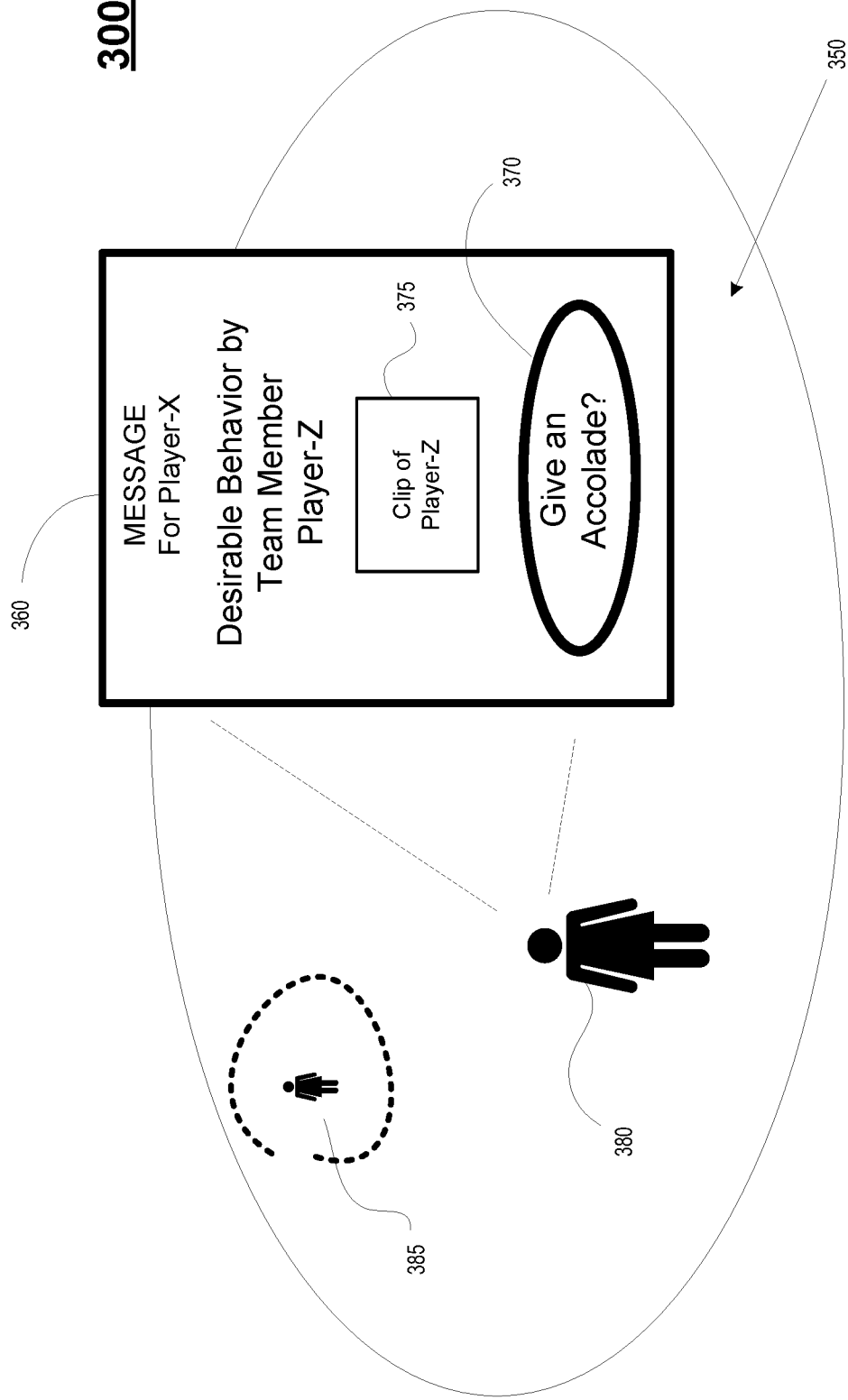
FIG. 3C is an illustration of one player giving another player an accolade during a gaming session, in accordance with one embodiment of the disclosure.

FIG. 3C is an illustration of one player giving another player an accolade during a gaming session, in accordance with one embodiment of the disclosure. As previously described, an accolade may be given at any time between players, including during post-game sessions, at any time period after the gaming session has completed, and during a gaming session. FIG. 3C provides an example of how an accolade may be given during a gaming session. For example, a gaming world 350 is shown during game plays of player-X (380) and player-Z (385). The gaming world 350 may be shown in a screen shot 300C taken from the perspective of player-X (380), whose avatar is enlarged. Embodiments of the present disclosure may be configured to detect and classify through artificial intelligence when desirable behavior is occurring in the gaming world 350. For example, player-Z (385) may be performing some action in the gaming world 350 that exhibits desirable behavior. Player-Z (385) is shown in the background of the perspective shown to player-X (380), wherein the avatar of player-Z (385) is diminished in size. Because both players are in the same area of the gaming world 350, player-X (380) is probably a witness to the activity performed by player-Z (385). After classification of the desirable behavior by player-Z (385), an accolade interface 360 may be presented to player 380, as is shown in screen shot 300C. For example, accolade interface 360 may be a pop-up message. Interface 360 may be visible for a limited time. Accolade interface 360 provides notification that desirable behavior has been performed by another player, which is player-Z (385). A quick summary of the desirable behavior or a preview (e.g., video clip 375) may be presented within interface 360. In some implementations, player-Z (385) is a teammate of player-X (380), wherein player-Z (385) may be performing an action that aids in accomplishing a team goal (e.g., capturing a necessary item), or may be performing any beneficial action (e.g., helping a teammate, saving a teammate, etc.). In other implementations, player-Z (385) is not a teammate of player-X (38), wherein player-Z is performing some desired action (e.g., some action that helps the community of players like building a bridge, helping an inexperienced player, etc. 370. Through the accolade interface 360, player-X (380) may give an accolade to player-Z (385), such as by selecting button 370 ("Give an Accolade") without performing any further action. In that manner, the giving of an accolade may be implemented with minimal interaction by player-X (38) in a seamless and frictionless manner so as to not interfere with the game play of player-X (380).

In another embodiment, the accolade may be given by the accolade system 120. For example, after the accolade system 120 detects and classifies desirable activity, the identity of the player (e.g., player-X) performing the desirable activity may be determined. The system may issue an accolade directly to player-X, without having another player (e.g., player-Y) actively give the accolade. For example, even though the occurrence of the desirable behavior was presented to one or more other players for purposes of giving an accolade, no accolade may have been given by another player, and as such, the accolade system 120 may then issue an accolade to player-X. In another example, player-X may be playing a single player game without any other players present in the gaming world to witness the desirable behavior. In that case, the accolade system 120 may issue an accolade to player-X for acting in a desirable manner.

In another embodiment, an accolade may be given by one or more spectators. For example, a gaming session may be viewable by one or more spectators. The gaming session viewable by the spectators may be live or recorded. The accolade system 120 may detect and classify desirable activity performed during the gaming session. The detection and classification may occur during the viewing, or may have occurred previous to the viewing by the spectators (e.g., classified during the live game play) of a recording of the gaming session. The accolade system 120 may present the occurrence of the desirable activity to one or more spectators for them to give one or more accolades to the player. In one embodiment, a group of spectators is presented with a vote (e.g., exceeding a threshold) that determines whether an accolade should be given to the player. In another embodiment, a spectator may flag the activity thought to be desirable, after which the accolade system may analyze through artificial intelligence if the activity rises to the level of desirable activity. In some embodiments, crowd sourcing (e.g., by players, spectators, or a combination) is used to determine if the activity rises to the level of desirable activity.

Artificial Intelligence Model for Classifying Player Behavior

Figure 4:
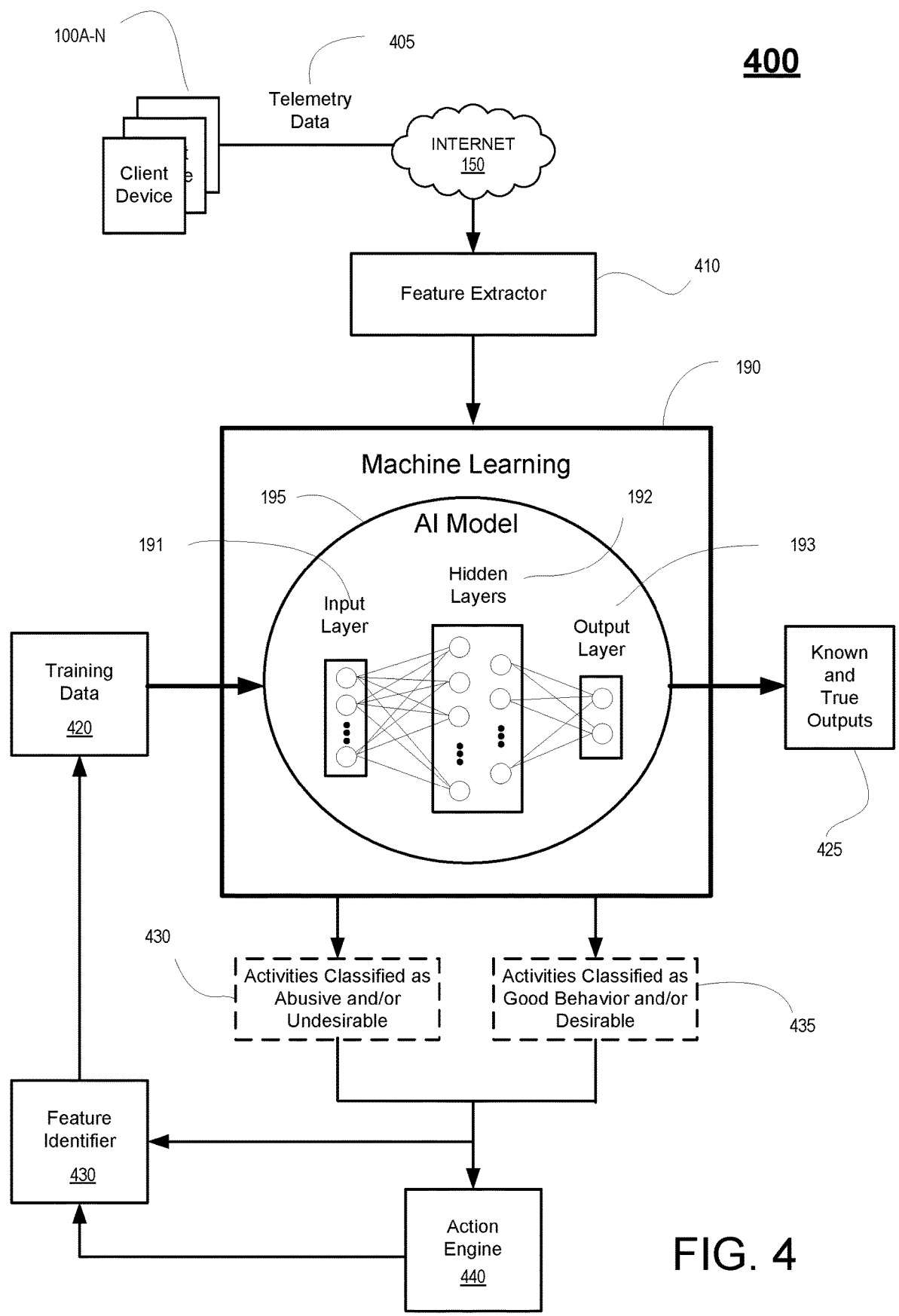
FIG. 4 is an illustration of a system configured to train and implement an artificial intelligence model configured to identify undesirable and/or desirable behavior, in accordance with one embodiment of the disclosure.

FIG. 4 is an illustration of a system 400 configured to train and implement an artificial intelligence model configured to identify and/or classify undesirable (e.g., abusive behavior) and/or desirable behavior, in accordance with one embodiment of the disclosure. In embodiments of the present disclosure, behavior of players can be classified using an AI model 195, also referred to as an AI learning model. In general, the AI model can be configured to learn and/or classify desirable and undesirable behavior (e.g., activity, actions, etc.) among players. The AI model is updateable by providing feedback and/or trusted data to continually train the AI model. In one embodiment, the AI learning model is a machine learning model configured to apply machine learning to classify behavior of players. In another embodiment, the AI learning model is a deep learning model configured to apply deep learning to classify behavior of players, wherein machine learning is a sub-class of artificial intelligence, and deep learning is a sub-class of machine learning. As such, artificial intelligence is used to classify good actions and/or activities (e.g., desirable behavior) by players, as well as bad actions and/or activities (e.g., undesirable behavior) of players.

For example, the AI model can be configured to monitor gaming session activity in order to provide input into the AI model 195 for learning what is desirable and undesirable activities during a learning phase, and for classifying player activity that exhibits undesirable behavior (e.g., bad, abusive, etc.) and/or desirable (e.g., good). In particular, telemetry data 405 is collected from a plurality of client devices 100A-N of a plurality of players participating in one or more gaming sessions associated with one or more video games. Client devices may be local to corresponding users, or may be instances of executing engines (e.g., including a CPU, GPU, etc.) supported by a cloud gaming network. As previously described, telemetry data (or state data) may include game state data, user saved data, and metadata. Specifically, game state data defines the state of the game play of an executing video game for a player at a particular point in time. Game state data allows for the generation of the gaming environment at the corresponding point in the game play. For example, game state data may include states of devices used for rending the game play (e.g., states of the CPU, GPU, memory, register values, etc.), identification of the executable code to execute the video game at that point, game characters, game objects, object and/or game attributes, graphic overlays, and other information. User saved data includes information that personalizes the video game for the corresponding player. For example, user saved data may include character information and/or attributes that are personalized to a player (e.g., location, shape, look, clothing, weaponry, assets, etc.) in order to generate a character and character state that is unique to the player for the point in the game play, game attributes for the player (e.g., game difficulty selected, game level, character attributes, character location, number of lives, trophies, achievements, rewards, etc.), user profile data, and other information. Metadata is configured to provide relational information and/or context for other information, such as the game state data and the user saved data. For example, metadata may include information describing the gaming context of a particular point in the game play of a player, such as where in the game the player is, type of game, mood of the game, rating of game (e.g., maturity level), the number of other players there are in the gaming environment, game dimension displayed, the time of the collection of information, the types of information collected, region or location of the internet connection, which players are playing a particular gaming session, descriptive information, game title, game title version, franchise, format of game title distribution, network connectivity, downloadable content accessed, links, language, system requirements, hardware, credits, achievements, awards, trophies, and other information.

As shown, streams of telemetry data 405 associated with the client devices 100A-N, such as data generated and distributed through a cloud gaming system, is collected by the AI processor 160 (e.g., including a machine learning system, deep learning system, etc.). That is, the streams of telemetry data 405 captured during game play of players in one or more gaming sessions is delivered to the feature extractor 410 that is configured to extract out the salient and/or relevant features from the telemetry data 405 that is useful in classifying undesirable and desirable behavior of players during one or more gaming sessions. Features may be digital representations of phenomena observed during the game play. Purely for illustration purposes, some examples of phenomena occurring during game play may be objects in a video frame, activities of characters in game play, actions of characters, activities of players, etc.

Previously, useful or learned features may be determined during a training phase of the AI model using artificial intelligence. In particular, the machine learning engine 190 (or a deep learning engine) and/or feature extractor 410 may be configured to define features that are associated with player behavior, and more particularly to targeted player behavior (e.g., undesirable and desirable behavior). The training phase may use training data 420 or telemetry data 405 generated from live or recorded game play. Feature selection and/or extraction may also be performed to reduce the number of features for relevancy, accuracy, and efficiency when implementing the AI model 195. In some implementations, both feature definition and extraction is performed by the AI model 195, such that feature learning and extraction is performed internally within the AI model. Features are learned through input samples that are logically connected through hidden layers to an output during training of the AI model. Features that are found to be useful (e.g., learned) may be further broken down and analyzed to determine additional useful features (e.g., using feature construction techniques).

Relevant features from the telemetry data 405 extracted from the telemetry data using the feature extractor 410 are provided as input to the machine learning engine 190. The machine learning system may be configured for training or implementation. Specifically, during the training phase, the AI model 195 (e.g., machine learning model) is trained using a training AI algorithm (e.g., machine learning or deep learning training algorithm) that is configured to classify undesirable behavior (e.g., abusive behavior) and desirable behavior (e.g., good behavior) using training data (e.g., data 420 and/or telemetry data 405). In other configurations, the AI training algorithm may be used for classifying different phenomena. During an implementation phase, the AI model 195 classifies undesirable behavior and desirable behavior from telemetry data 405 collected during one or more gaming sessions.

As shown, the AI model 195 may be configured for a training phase (e.g., learning features and classifiers) (i.e., in a horizontal direction), or for an implementation phase (e.g., classifying player behavior) (i.e., in a vertical direction). During the training phase, training data 420 may be provided as input to the machine learning system 190, which implements a training algorithm to fit the structure of the AI model 195 to the training data by tweaking the parameters of the AI model, so that the trained AI model provides an accurate relationship between input (training and/or telemetry data) and output (classified data). Training and/or learning may be supervised using known and true outputs 425 (e.g., known instances of desirable and undesirable behavior) associated with the training data 420, such as to learn the appropriate features. Training and/or learning may be unsupervised, wherein no known or true outputs are provided for the training data 420 or telemetry data 405 (when used for training), such that input data is only provided and the AI model learns to identify the desirable and/or undesirable behaviors, and/or to learn the associated features. Training may implement both supervised and unsupervised training. For example, after performing unsupervised training, supervised learning may be performed with known data. Training and implementation of the AI model 195 is further described below.

The machine learning engine 190 may be configured as a neural network used to train the AI model 195 through learning, in accordance with one embodiment of the disclosure. In one embodiment, machine learning engine 190 may be implemented to classify player behavior, such as undesirable behavior (e.g., abusive, bad, etc.) and/or desirable behavior (e.g., good). Specifically, machine learning engine 190 is configured to analyze training data 420 and/or telemetry data 405 during the training phase to build (e.g., train through learning) the AI model 195, wherein the training data may include telemetry data associated with training game plays, controller inputs, biometric data, and any useful information associated with player behavior, etc. As such, the training data 420 and/or telemetry data 405 are fed to the machine learning engine 190, which utilizes artificial intelligence, including supervised learning algorithms, unsupervised learning algorithms, reinforcement learning, or other artificial intelligence-based algorithms to build the AI model 195 configured to classify undesirable (e.g., abusive, bad, etc.) behavior and desirable (e.g., good) behavior in players during gaming sessions.

The neural network in the machine learning engine 190 represents an example of an automated analysis tool for analyzing data sets to classify player behavior. Different types of neural networks are possible for applying artificial intelligence. Though a machine learning engine applying machine learning is shown, it is understood that other AI techniques may be utilized, such as deep learning applied by a deep learning engine, in other embodiments. For example, the neural network supports machine learning that may be implemented by the machine learning engine 190. In another example, the neural network supports a deep learning network that may be implemented by deep learning engine, such as one set up as a Markov decision process (MDP) that supports a reinforcement learning algorithm. Accordingly, a deep neural network, a convolutional deep neural network, and/or a recurrent neural network using supervised or unsupervised training can be implemented.

Generally, the neural network in the machine learning engine 190 represents a network of interconnected nodes, such as an artificial neural network, and is used to train the AI model 195. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network implementing the AI model 195 includes a hierarchy of nodes. At the lowest hierarchy level, an input layer 191 exists. The input layer 191 includes a set of input nodes. For example, each of these input nodes is mapped to local data 115 collected actively through actuators or passively by sensors during monitoring and/or querying of the user and the environment associated with the user by the autonomous personal companion 100.

At the highest hierarchical level, an output layer 193 exists. The output layer 193 includes a set of output nodes. An output node represents a decision (e.g., prediction) that relates to one or more components of a local AI model 120, for example. As previously described, the output nodes may classify undesirable player behavior (e.g., abusive, bad, etc.) and/or desirable player behavior (e.g., good), wherein the input may define various telemetry data collected from training gaming session and/or live gaming session that can be used for training. These results can be compared to predetermined and true results obtained from previous interactions and monitoring of players, from player or spectator identification (flagging), from crowd sourcing, from user input, and the like, in order to refine and/or modify the parameters used by the machine learning engine 190 to iteratively determine the appropriate classification of player behavior.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network in the machine learning engine 190 configured to build the AI model 195 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a linear rectifier function $f(x)= \max(0,x)$.

The neural network in the machine learning engine 190 configured to build the AI model 195 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network in the machine learning engine 190 configured to build the AI model 195 can be from a same data domain. For instance, the neural network is trained for learning the undesirable (e.g., abusive, bad, etc.) and/or desirable (e.g., good) player behavior for a given set of inputs or input data. For example, the data domain includes gaming session data considered as baseline input data. In another example, the training dataset is from different data domains to include input data other than baseline.

As such, the neural network in the machine learning engine 190 configured to build the AI model 195 may identify and/or classify undesirable player behavior (e.g., abusive, bad, etc.) and/or desirable player behavior (e.g., good) for a given set of inputs (e.g., training data). Based on these predictive results, the neural network 190 may also define an AI model 195 that is used to classify undesirable behavior and desirable behavior using collected telemetry data.

During an implementation phase (also referred to as generalization), the AI model 195 is used to predict and/or classify undesirable behavior (e.g., abusive, bad, etc.) and/or desirable behavior (e.g., good) from the telemetry data 405 (i.e., not training data) based on the configuration of the AI model.

As such, for a given telemetry data 405 that is provided as input to the feature extractor 410 and/or directly to the machine learning engine 190, undesirable behavior (e.g., abusive, bad, etc.) 430 that is classified may be provided as an output from the AI model 195. Some examples of undesirable behavior that is classified using the AI model 195 may include: abusive activities of a player that leads to another player quitting the gaming session; the intentional killing of a player's own character or the character of a teammate (e.g., intentional killing) in order to hurt their group of teammates or friends; spamming another player with emoticons; activities that are intended to cause grief to another player (e.g., griefing); activities that do not make sense within the gaming session; inaction when action is required; playing at less than a player's skill level; negative commentary; excessive use of game features (e.g., chat, emoticons, etc.); activities of players showing the lack of regard for teammates, such as one player decides not to help the team achieve a goal, or when a player watches with enjoyment when another player (e.g., character of another player) die or experience hardship and/or issues (e.g., experiencing schadenfreude), or when a player watches another player die or experience hardship and/or issues when the watching player could have provided assistance; classifying the positive engagement of a player, activities that exhibit poor teamwork, etc. If behavior classified as being undesirable for a player is extreme, or if multiple instances of undesirable behavior by the same player rises to a noticeable level, that player may be marked or classified as being an abuser by the system 400.

Also, for a given telemetry data 405 that is provided as input to the feature extractor 410 and/or directly to the machine learning engine 190, desirable behavior (e.g., good) 435 that is classified may be provided as an output from the AI model 195. Some examples of desirable behavior that can be classified using the AI model 195 include: activities showing good teamwork between players; positive affirmation of teammates; the use of positive game language during a gaming session; the positive engagement of a player, activities that help an inexperienced player, rendering aid to a teammate, indicators of desirable behavior including an excessive number of friend requests, etc.

Undesirable and/or abusive behavior can be identified with one or more metrics that each can be measured and verified with reference to a threshold, such as a standard, that also can be measured. For example, the undesirable and/or abusive behavior can be defined as having or lowering some metric (e.g., a score in association with video game below an expected threshold for a player of the same ability. As an illustration, undesirable behavior can be associated with a delay in the advancement of a video game that is beyond any expected delay for a player of that ability. In that case, one metric can measure the actual advancement of a player through a video game, wherein the player is associated with a certain skill level (e.g., as defined within a user profile). Another metric can measure the expected or average advancement through the video game for a player of approximately the same skill level. The expected and/or average advancement can define a standard advancement for a corresponding player skill level. An expected threshold can be tied to the expected or average advancement through the video game. A delay in the advancement through the video game is the difference from the measurement of the actual advancement through the video game and the expected advancement through the video game. Accordingly, an expected threshold can be associated with an acceptable delay in an advancement in a video game for a player of the same skill level (e.g., within a standard deviation) from the expected or average advancement. Any delay that is outside the expected threshold (e.g., accepted delay) can be considered as undesirable and/or abusive behavior. It is understood that the expected thresholds may vary depending on the skill level of the player. In another illustration, undesirable and/or abusive behavior can be defined by a delay in the time to complete a game that is outside of an expected threshold, such as an acceptable delay of time in completing the game made with reference to an average time to complete the game for a player of approximately the same skill level.

As such, undesirable and/or abusive behavior can be quantified with one or more corresponding metrics. For example, behavior can be quantified by a first metric, and compared and/or verified against a threshold, wherein the threshold may vary depending on the skill level of the corresponding player. That is, the threshold and/or expected threshold is associated with a standard that may vary depending on the skill level of the type of player (e.g., beginner, some experience, expert, etc.). The threshold and/or expected threshold can be stored in a database, such as database 140. The behavior becomes undesirable and/or abusive when the first metric goes beyond the threshold. In that manner, behavior outliers can be discovered, which may be associated with undesirable and/or abusive behavior.

In other embodiments, good behavior can be quantified in the same manner. For example, player behavior can be quantified by some metric, and compared to a threshold, such that behavior that meets and/or exceeds that threshold is considered good behavior.

In one embodiment, a user profile filter function may be performed on the classification of player-B behavior from the AI model 195. In particular, user profile data could be provided as an input into the AI model 195, such that the filter function is provided within the AI model and before an output classifying player behavior is provided by the AI model 195. In some embodiments, the filter function is provided after the AI model 195 has provided an output classifying player behavior. An example of filtering occurs in cases where a player may be not accomplishing a task even though that task is required for completing a goal of a video game. The AI model 195 would determine that the actions of the player included intentionally avoiding performing the accomplishing of the task, and the AI model 195 would classify that inaction by the player as being abusive (e.g., passive abuse). Other forms of passive abuse include actions and/or activities by a player that do not make any sense within the corresponding gaming session, activity that are outliers (e.g., feature used more than an average use, etc.), a showing of non-interest, etc. On the other hand, active abuse may include the intentional performance of actions and/or activities to negatively affect another player's enjoyment of game play (e.g., intentional killing, interfering with another player, not playing at a lower skill level than is indicated in user profile, etc.). Further, user profile data may indicate that the player is highly skilled, and should have known that the task existed, and how to accomplish the task, thereby confirming that the inaction of the player was abusive because that player may not have been performing up to his or her ability. However, even though the player is highly skilled, the filter function may determine from the user profile data that the player is a beginner in the video game. In many video games, experienced players have a huge advantage over beginning players, even though the beginning player is highly skilled. That is, it takes time before a player, even a highly skilled player, can become knowledgeable in how to play a video game, and what is needed to do in the video game. As such, even though a player may appear to be passively abusing a video game (e.g., intentionally not performing p to his or her ability by not performing certain actions within the video game and hurting a team's ability to complete a task), the system 400 may determine that the player is a beginner so that the inaction of the player is then not considered as being abusive, or that the flagging of the player for exhibiting undesirable behavior was in fact a false positive. Normally, without analyzing the user profile data through a filter function, the system 400 would determine that the inaction of the player is considered abusive. For example, the player may be wandering around the gaming world trying to learn as much as possible about the video game, and miss an opportunity to accomplish a task in furtherance of a team goal. At this point in playing the game, the player who is a beginner may not even know that the task is necessary, may not know that the task exists, and may not even know how to accomplish the task. As such, even though it appears as if the highly skilled player should at this point in the game play perform some action but does not, after filtering with the user profile the system 400 may not classify the inaction as being abusive because the player is a beginner in the video game.

By classifying and identifying undesirable behaviors 430 and/or desirable behaviors 435 of players, additional system features or services may be supported. In particular, after classification of player behavior, action engine 440 is configured to take additional action and/or respond to the classification of undesirable and/or desirable behavior of players. That is, action engine 440 may be configurable to perform any further action and/or response. The actions and/or responses may be performed during the gaming session (e.g., close in time to the classification of undesirable and/or desirable behavior) and/or after the gaming session.

For example, action engine 440 may be configured to provide verification of the classified behavior, such as through verification through crowd sourcing, by one or more teammates, by a compliance group or moderation team, by one or more other players, by one or more spectators 601$n$, and others. Once player behavior has been verified (e.g., as being undesirable or desirable), the action engine 440 may present that behavior for purposes of training the AI model, such that the verified activity is fed back to the machine learning engine. That is, information related to the classified desirable behavior may be sent to the feature identifier 430 in order to extract features related to the classified desirable behavior. In one implementation, those features were previously provided as input to the machine learning engine, and can be accessed or readily determined for purposes of training. In another implementation, those features may be newly determined. The identified features may be newly included within the training data 420, and provided as input into the machine learning engine for purposes of updating the AI model 195. Because the classified behavior (undesirable and/or desirable) is verified, the machine learning engine could apply a supervised learning algorithm by assigning the classified desirable behavior as being a true output 425 when updating the AI model, in one embodiment.

In other examples, the action engine may provide additional responses, such as masking targets and/or victims of undesirable and/or abusive behavior, marking players that exhibit undesirable behavior (e.g., abusive, bad, etc.) for the benefit of targets and/or victims and/or other players, providing notification of abusive behavior to the targeted player and/or victim, providing a warning to the player exhibiting undesirable behavior, banning a player exhibiting undesirable behavior, providing statistics listing players exhibiting undesirable behavior, etc.

Figure 5:
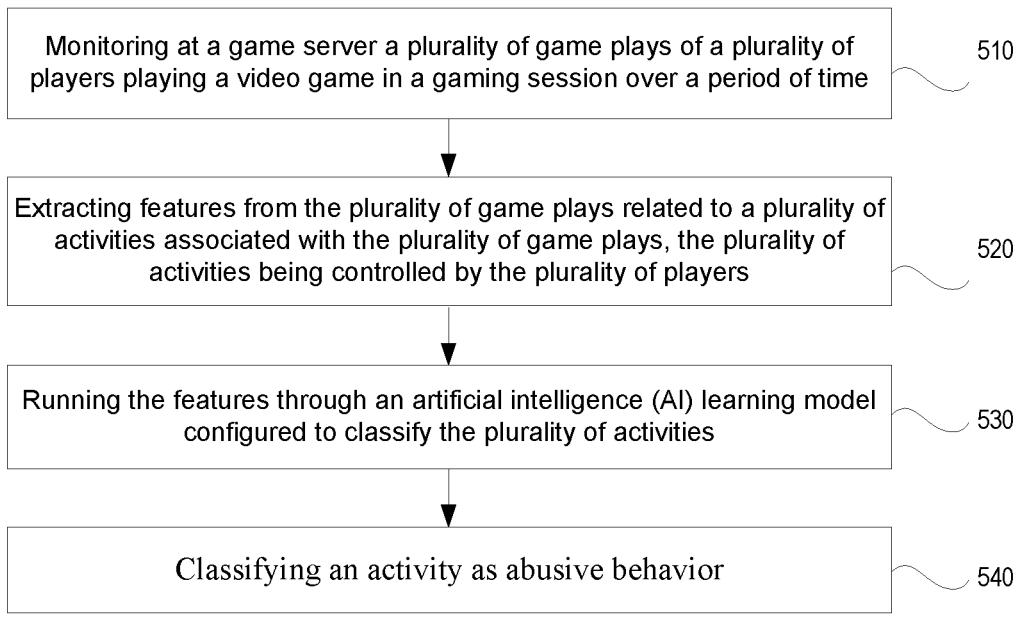
FIG. 5 is a flow diagram illustrating a method for classifying undesirable and/or desirable behavior, in accordance with one embodiment of the disclosure.

With the detailed description of the game cloud system, abuse response system, accolade system, system 400, AI processor, machine learning engine, and AI model, flow diagram 500 of FIG. 5 discloses a method for identifying undesirable and/or desirable behavior by one or more players in one or more gaming sessions, in accordance with one embodiment of the disclosure. The operations performed in flow diagram may be implemented by one or more of the entities previously described components, and also system 400 described in FIG. 4 that is configured to classify player behavior, in some embodiments.

At 510, the method includes monitoring at a game server a plurality of game plays of a plurality of players playing one or more video games in one or more gaming sessions over a period of time. In one implementation, the monitoring may be partitioned, such that the game plays of one or more players playing a particular video game in a gaming session (e.g., multi-player gaming session) are monitored.

In particular, telemetry data that is generated in associated with the execution of one or more video games can be collected. A video game may be executing on a client device of a corresponding player locally to the user, or at a back-end game server implementing instances of executing engines (e.g., hardware or virtualized computing system). The telemetry data may be delivered through a network, and collected at the back-end game server. As previously described, the telemetry data could include state data, such as game state data, user saved data, and metadata.

At 520, the method includes extracting features from the plurality of game plays related to a plurality of activities associated with the plurality of game plays, the plurality of activities being controlled by the plurality of players. In particular, streams of telemetry data associated with the client devices of the plurality of players is provided as input into a feature extractor. The feature extractor is associated with or internal to an AI processing engine, such as a machine learning engine, or deep learning engine, etc. For example, in some implementations, feature extraction is performed within the AI model. As previously described, the feature extractor has been trained to parse out the features from the telemetry data that are relevant to an AI model configured to classify player behavior. As such, rather than analyzing the entire set of telemetry data, only relevant and/or learned features are analyzed for detection of player behavior.

At 530, the method includes running the features through an artificial intelligence (AI) learning model configured to classify the plurality of activities. That is, the relevant features extracted from the telemetry data by the feature extractor is provided as input to the AI model. In one implementation, feature extraction is performed internal to the AI model, and as such the extracted features are provided as input to further internal layers within the AI model. Previously, the AI model is trained using training data to construct the relevant features used by the AI model for classification, wherein the AI model is also trained for classifying player behavior that is undesirable (e.g., abusive, bad, etc.) and/or desirable behavior (e.g., good).

At 540, the method includes classifying an activity associated with a player as abusive behavior. In particular, during an implementation phase (also referred to as generalization), the AI model 195 is used to classify undesirable behavior and/or desirable behavior from the telemetry data based on the configuration of the AI model. In this embodiment, undesirable behavior is classified. For example, the undesirable behavior may be intentionally performed in order to negatively impact the gaming experience of at least one other player. In that manner, once behavior is detected that can be abusive to one or more other players, action can be taken to mitigate the effect of the abusive behavior, and further to persuade the player exhibiting the abusive behavior to change. For example, the player may be warned, or placed into a holding pattern (e.g., timeout, suspension, etc.) for a period of time, or if serious enough placed into a permanent ban, etc.

Abusive behavior may range from being mildly annoying to bordering on and even crossing over to bordering on illegal or criminal activity. Though there are too many to list, some clearly abusive behavior or actions may include online harassment, bullying, belittling, cheating, griefing, intentional kill, and purposeful throwing of games. For example, online and/or offline harassment may include verbal abuse (e.g., screaming at teammates, sending inappropriate messages, etc.) hurled over an online chat during or post-game play of a game title. Bullying and belittling of a targeted player and/or victim include behavior that marginalizes the game play of a targeted player and/or victim or contributions to a team. Cheating may involve any method to gain an unfair advantage over other players, such as using aim bots, speed hacks to speed up controller input responses, etc. Griefing has evolved within the gaming community to include any action that is performed with the intent to cause grief to another player. Intentional kills involves the intentional killing of a teammate for whatever reason, such as when the abuser thinks the target is a poor player, the abuser is harassing the target, etc. When throwing a game, the abuser may prematurely think that there is no way that a team can win during an online gaming session, and will purposefully throw in the towel or raise the white flag by purposefully and unilaterally acting in a manner to have the team lose as quickly as possible without consideration of other team members, for example who may be still hoping for a last ditch win. The previous examples show some of the more obvious abusive behaviors and/or actions, but is not fully representative of the many less distinct, and possibly more complex abusive behaviors and/or actions that may exist within online gaming.

In other embodiments, the AI model could be configured to classify activities associated with a player as being desirable behavior. Once the desirable behavior is classified, additional actions can be taken to promote that type of behavior. For example, as previously described, an accolade system 120 may be implemented as a way of recognizing the desirable behavior, wherein recognition could be peer or system driven. For example, one or more peers could give an accolade to a player that is exhibiting desirable behavior. In another example, an accolade system could detect and/or classify desirable behavior, and give an accolade to the player exhibiting that desirable behavior.

In one embodiment, classification of a behavior by a player as being undesirable (e.g., abusive, bad, etc.) is dependent upon whether the behavior negatively affects the game play of another player. In particular, it may be determined that the activity by the player directly leads to another player leaving the gaming session, wherein both players are participating in a gaming session together. That is, the activity of the player causes the other player to leave the gaming session. In one example, a player that is away from keyboard (AWK) may be determined to have left the gaming session. Other trends or patterns of behavior indicating a negative effect of undesirable behavior on another player may include logging off the gaming session, a player commenting on how the gaming session may deteriorate now that a certain player has joined, a player trying to reduce the effect of undesirable behavior, a spike in activity in using a normal feature (e.g., the feature is only anticipated to be used a minima number of times, such as emoticons) which may indicate using the feature to negatively affect another player (e.g., spamming using emoticons), a parameter number in a user profile that is outside the standard deviation which indicates an outlier (e.g., exceeding the average number of contacts to a user which may indicate abuse or grooming of a targeted player and/or victim, a player exceeding the average number of contacts with other players which may indicate overuse of a communication medium, exceeding the number of friendly fire incidents which may indicate intentional killing, etc.)

For example, the undesirable behavior may be directed to the other player, such that the player is being abusive towards the other player. In another example, the undesirable behavior may be directed towards a third party, or to generally anyone in the area of the gaming world (e.g., the behavior is disruptive to the game play of anyone in the area). The result the activity by the player is to cause the other player to leave the gaming session. In other embodiments, the undesirable behavior may cause the other player to move to another area, or may cause the other player to perform actions in order to try to thwart the undesirable actions of the player, among other.

By classifying and identifying undesirable and/or desirable behaviors of players, additional system features or services may be supported. For example, additional monitoring and tracking of those types of behavior over a period of time may also be implemented. In particular, returning to FIG. 4, after classification of player behavior, action engine 440 is configured to take additional action and/or respond to the classification of undesirable and/or desirable behavior of players. That is, action engine 440 may be configurable to perform any further action and/or response, such as updating the underlying AI model, masking targeted players and/or victims, marking players that exhibit undesirable behavior (e.g., abusive, bad, etc.) for the benefit of targeted players, victims and/or other players, providing notification of abusive behavior to the targeted player and/or victim, providing a warning to the player exhibiting undesirable behavior, banning a player exhibiting undesirable behavior, providing statistics listing players exhibiting undesirable behavior, etc. The additional actions and/or responses may be taken in-game (e.g., real-time), or post-game. Other features are well supported, some of which are described below.

Figure 6A:
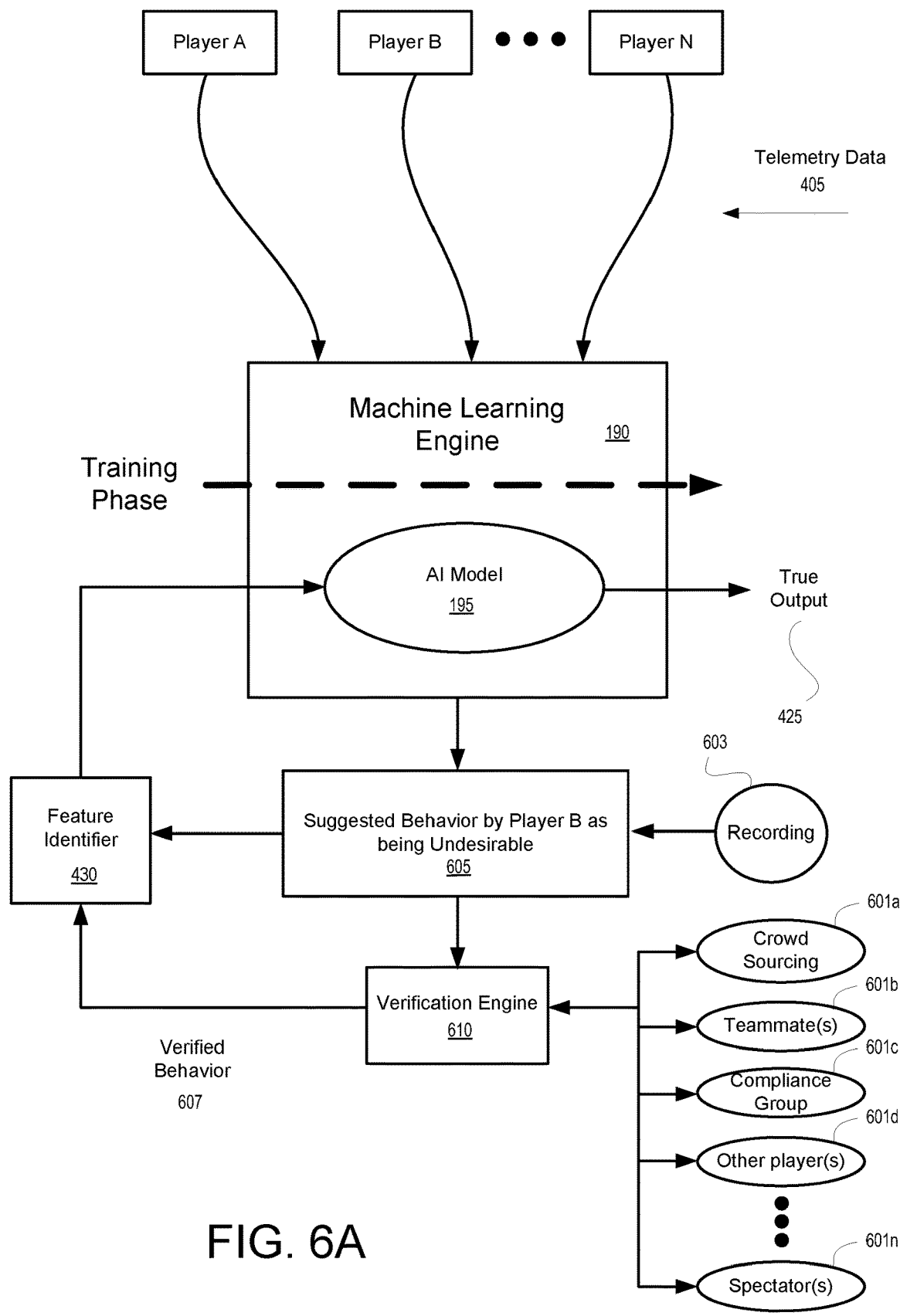
FIG. 6A illustrates a data flow diagram illustrating the verification of undesirable behavior suggested by a system configured to train and implement an artificial intelligence model that can identify behavior, in accordance with one embodiment of the disclosure.

FIG. 6A illustrates a data flow diagram 600A illustrating the verification of undesirable behavior suggested by a system configured to train and implement an artificial intelligence model that can identify behavior, in accordance with one embodiment of the disclosure. For purposes of illustration, FIG. 6A is focused on verifying undesirable behavior; however, in other embodiments, data flow diagram 600A can be modified to perform the verification of desirable behavior that is suggested by the system configured to train and implement an artificial intelligence model that can identify behavior.

As shown, telemetry data 405 from the game play of players A-N is collected and provided to a machine learning engine 190, which is configured to build and/or execute an AI model 195 through training and/or implementation phases. During the training phase, the machine learning engine 190 trains the AI model 195 using a training AI algorithm in order to classify undesirable behavior (e.g., abusive behavior) and/or desirable behavior (e.g., good) using training data, as previously described. During an implementation phase, the AI model 195 as executed by the machine learning engine 190 classifies undesirable behavior and desirable behavior from the telemetry data 405 that may be associated with one or more gaming sessions.

In FIG. 6A, additional verification of the output from the AI model 195 is provided for training. In particular, the AI model 195 provides as output 605 a suggestion that behavior by player-B is undesirable. Basically, the AI model 195 operates in an implementation phase and classifies the behavior by player-B as being undesirable (e.g., abusive, bad, etc.). The identification of player-B as the actor may be determined from game state data, user profile data, and/or metadata. For example, the AI model may be operating during a beta phase using real-time gaming sessions, or may be fully operational, wherein the opportunity for additional verification of the output is implemented. In that manner, classified undesirable behavior 430 and/or classified desirable behavior 435 provided as output from the AI model 195 during an implementation phase, as shown in FIG. 4, may be further verified and provided as training data through a verification process, such as one being implemented by the action engine 440.

A recording 603 and/or other captured data of an associated time period is also captured, for example, the associated one or more gaming sessions may be continually captured, and a recording 603 and/or other data may be generated that includes game plays for a relevant period including the behavior of player-B that was suggested as being undesirable.

The output 605 including the suggestion that behavior by player-B is undesirable is provided to the verification engine 610. In addition, the recording 603 and/or other data may also be provided to the verification engine 610 that is configured to verify that the behavior by player-B is undesirable. Verification can be performed in many ways, such as verification through crowd sourcing 601a, verification by one or more teammates 601b, verification by a compliance group 601c or moderation team, verification by one or more other players 601d, verification by one or more spectators 601n, and others. For example, a corresponding verification source may view the recording 603 to determine if any undesirable activity is noticed. A verification response may be returned back to the verification engine 610, wherein the response may verify that the activity by player-B (611) was undesirable, or may verify that the activity by player-B was acceptable. When there is no response returned, it may also indicate that the activity by player-B did not rise to the level of being undesirable, or that player-X was not interested in providing a valid response. Some additional examples of verification processes are provided in FIGS. 6B-6C.

The verification engine 610 may present the verified behavior back to the machine learning engine 190 for purposes of training the AI model 195, and/or updating the AI model (e.g., using a training phase). Features associated with the verified behavior are identified (e.g., from input to the machine learning engine 190) or newly extracted through the feature identifier 430. As such, parameters in the AI model are modified and/or updated based on the verified responses. Because the behavior is verified, the machine learning engine 190 may apply supervised learning (e.g., by setting the verified behavior as being a true output 425) when training the AI model. For example, if the behavior by player-B was verified as being undesirable, then the parameters in the AI model change their weighting (e.g., increase their weighting) to give a more solid classification of undesirable behavior. On the other hand, if the behavior by player-B (611) was acceptable, then the parameters in the AI model may be modified (e.g., decrease their weighting) to give a less solid classification of undesirable behavior, or even to remove that activity from being classified as undesirable.

As previously described, the flow diagram 600A may be configured to suggest through classification of behavior by player-B as being desirable. In that manner, verification of desirable behavior may be achieved, and submitted to the machine learning engine 190 for purposes of updating/training the AI model 195 to better classify behavior as being desirable, wherein the AI model 195 may be configured to classify undesirable and/or desirable behavior. For example, parameters in the underlying AI model 195 (e.g., configured to classify desirable behavior) can be modified and/or updated based on the verified responses, such as being strengthened (e.g., increase weighting) when the behavior is verified as being desirable, or lessened when the behavior is verified as being acceptable. Supervised learning may be applied by the machine learning engine 190 to train the AI model 195 by assigning the verified behavior as being a true output 425. In that manner, the AI model 195 may learn patterns of desired (e.g., good) behavior (e.g., teamwork, helping others, providing aid to other players, providing instructions to inexperienced players, etc.). Additional action may be taken, such as implementing an accolade system 120 for purposes of rewarding players that are acting in a desirable manner, such as by increasing their reputation within the online gaming community 200, as previously described.

For example, player verification may be performed to verify undesirable and/or desirable behavior. In some implementations, the one or more players providing verification may be teammates participating in a multi-player gaming session of a video game. In other implementations, the one or more players providing verification may not be teammates 601b (e.g., in an effort to reduce team bias for player-B) and may be playing in the same gaming session as player-B, or may be other players playing the same video game as player-B (but not in the same gaming session), or may be other players 601d playing a different video game as player-B. In one embodiment, the players may vote as a group to send the behavior (undesirable and/or desirable) in question to a compliance group 601c and/or moderation team that may include a group of humans tasked with determining compliance of behavior within an online community, for further verification. Further, the verification process may be performed at any time after the suggestion that the behavior of player-B is undesirable, such as immediately during a post-game session, or after some period of time.

Figure 6B:
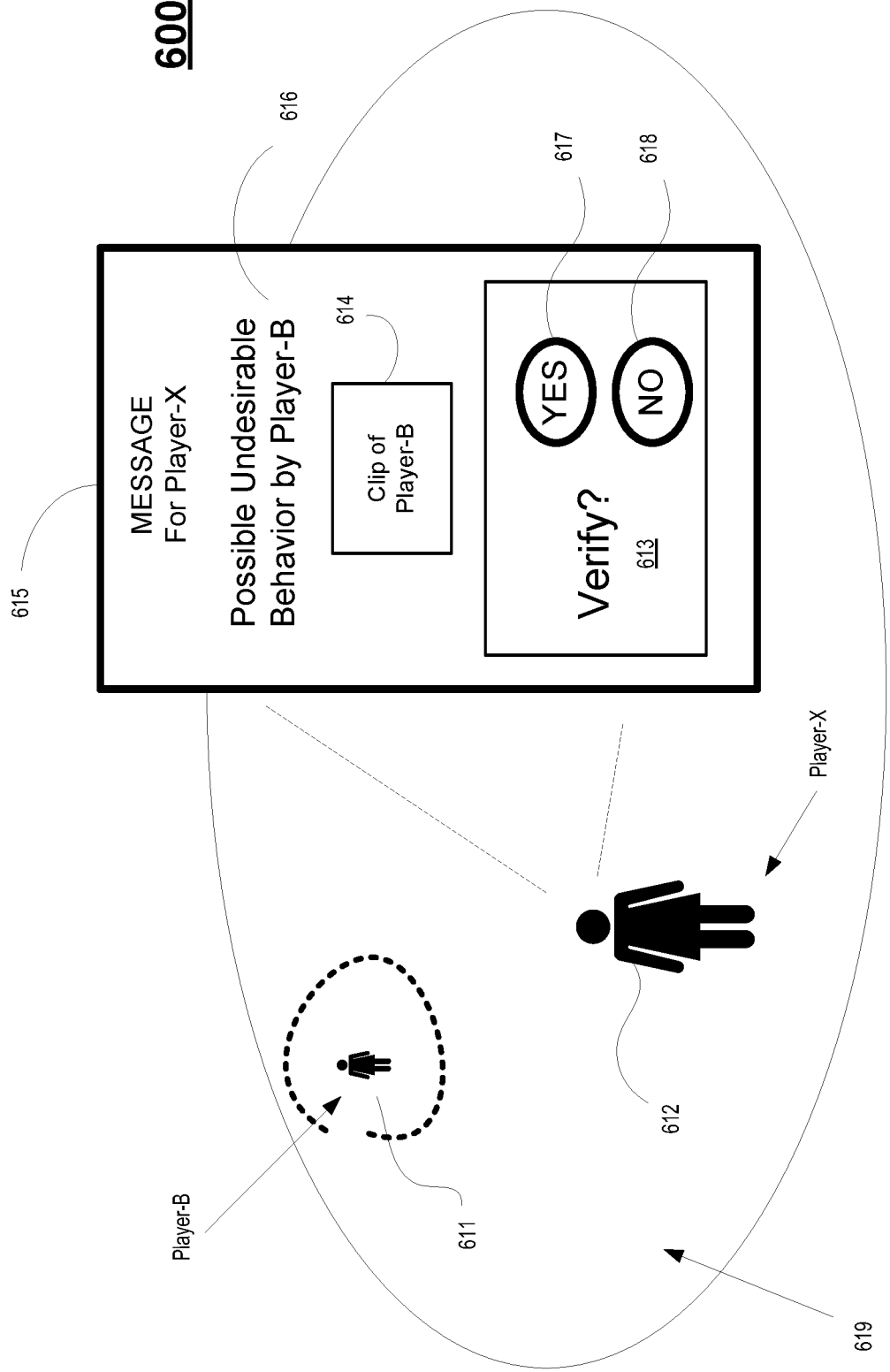
FIG. 6B illustrates a pop-up message requesting verification of undesirable behavior, in accordance with one embodiment of the disclosure.

In an example of player verification, behavior by player-B that is classified and suggested as being undesirable may be presented to another player-X. Player-X may verify that the suggested behavior is indeed undesirable. For illustration, FIG. 6B illustrates a screen shot 600B of a gaming world 619, wherein player-X (612) and player-B (611) are playing a video game in a multi-player gaming session. As previously described, though players 611 and 612 are shown in the same gaming session, the players need not be in the same gaming session, and need not be teammates. Screen shot 600B may be taken from the perspective of player-X (612), whose avatar is enlarged. Player-B (611) may be performing some action in the gaming world 619 that is suggested to be undesirable behavior. Player-B (611) is shown in the background of the perspective shown to player-X (612), wherein the avatar of player-B is diminished in size.

A pop-up message 615 and/or notification may be provided to player-X (612). The message 615 may be given to player-X (612) with or without a request for the message from player-X. A short title or description 616 is provided in pop-up message 615 for purposes of requesting verification of undesirable behavior by player-B (611). Information describing the activity by player-B (611) is also provided in pop-up message 615 so that player-X (612) can make an informed decision on whether the activity is undesirable or not. For example, a clip 614 (e.g., video and audio) of the activity by player-B (612) may be included in pop-up message 615 for viewing by player-X (611). Other types of information may be provided instead of or with the video clip 614 (e.g., text, audio, etc.).

In addition, an interface 613 is provided for player-X to send back verification to the system identifying player behavior, such as the abuse response engine 145 (or accolade system 120 in other embodiments). Interface 613 may be differently configured in various embodiments, wherein each embodiment allows player-X (612) to verify whether the activity by player-B (611) is undesirable—at least in the opinion of player-X. For example, player-X may verify that the behavior by player-B is undesirable by selecting the "YES" button 617. In some cases, player-X can actively verify that the activity is not undesirable, or acceptable in the opinion of player-X, such as by selecting the "NO" button 618.

It may be implied that player-X (612) is of the opinion that the behavior of player-B does not rise to the level of being undesirable when there is no response by player-X (e.g., did not select any of the buttons 617 or 618). In other embodiments, further verification is needed before the underlying AI model can definitively determine that the behavior of player-B is undesirable or satisfactory. For example, the pop-up message 615 showing the behavior of player-B (611) may be provided to other players and/or entities for additional verification, such as when providing crowd sourced verification. The crowd sourced verification can be used to verify behavior by player-B (611) as being undesirable (e.g., abusive, bad, etc.) or not, and that verified behavior can be fed back to the machine learning engine 190 to update and/or further train the underlying AI model 195. When crowd sourcing, a threshold may be set to determine whether the crowd verifies undesirable behavior (e.g., greater than 75 percent, with a minimum of 10 members in the crowd, etc.). Also, the underlying AI model 195 will become refined as behavior by other players that is similar to the activity of player-B may be submitted to the AI model for learning/training, with or without additional verification.

FIG. 6C illustrates a data flow diagram 600C illustrating the verification of undesirable behavior that is flagged by a player, in accordance with one embodiment of the disclosure. For purposes of illustration, FIG. 6C is focused on verifying undesirable behavior; however, in other embodiments, data flow diagram 600C can be modified to perform the verification of desirable behavior that is suggested by the system configured to train and implement an artificial intelligence model that can identify behavior.

As shown, telemetry data 405 from the game play of players A-N is generated. Players A-N may be participating in a gaming session for an associated video game, wherein the players may be on the same team or different teams, or playing solo. In other embodiments, the telemetry data 405 may be associated with a replay of a gaming session, viewable by players and/or spectators. In addition, player-A flags the system (e.g., the abuse response engine 145 and/or the accolade system 120) indicating that some player behavior may possibly be undesirable (e.g., abusive, bad, etc.). For example, player-A may select a button that is present in an interface on the display, or a button on a controller, to generate a flag indicating the presence of undesirable behavior. In some embodiments, a player can only generate a flag that indicates possible undesirable behavior when the flagging player is a member of good standing in the online gaming community (e.g., is a good citizen), such as one that is not an abuser. Although player-A is shown to initiate a flag, the flagging of player behavior (undesirable and/or desirable) may originate through many sources, such as by a spectator (through a replay of a gaming session), by the system in an initial filter that generally recognizes behavior, etc.

In particular, the flag initiated/generated by player-A is detected by flag engine 621. At this point, telemetry data that is associated with the flag is accessed and/or captured by the data capture engine 621 as initiated by the flag, or as instructed by the flag engine 620. For example, associated telemetry data 424 corresponding to a certain time period calculated to capture the behavior of player-B (or any player being flagged) in relation to the generation of the flag is identified, accessed and/or captured. In some implementations, player-A may indicate what time period is necessary for data capture. Further, a video recording 623 (e.g., video and audio) may be captured (e.g., recording of the previous 10 minutes of game play from the initiation of the flag and the following 10 minutes of game play after initiation of the flag, or some other period.

Additional verification of the flagged behavior may be necessary. For example, some players may abuse the flag process (e.g., false flagging), such that the flagging itself may be deemed to be undesirable behavior. As an illustration, one player may repeatedly flag the behavior of a specific player as being abusive, when in fact the behavior is acceptable. The repeating flagging may rise to the level of being undesirable (e.g., harassing, abusive, etc.). As such, a verification process may be implemented to reduce misuse of the flagging process. For example, crowd sourcing may be implemented to verify that the player generating the flag is not abusing the flagging system, wherein crowd sourcing may indicate whether the player being flagged (i.e., the target of the flag) is actually exhibiting undesirable behavior (e.g., abusive, bad, etc.). The crowd may be part of the same team as player-A who is generating the flag, or may be part of another team, or one or more solo players. In another embodiment, to limit abuse of the flagging feature, the number of flags that a player may generate may be limited to a particular number. In that manner, even of the player is abusing the flagging feature, the number of abuses may be limited. In another embodiment, a warning is given to the player who is abusing the flagging feature, wherein the warning notifies the player that the system is aware of the undesirable behavior (overuse of the flagging feature), and to stop the undesirable behavior. The warning may indicate that other action may be necessary if the player continues the undesirable behavior.

In one embodiment, verification may be performed, at least in part, by the machine learning engine 190 through implementation of the AI model 195. In particular, associated telemetry data 424 is provided as input to the machine learning engine 190 to apply artificial intelligence in identifying the flagged behavior. Initiation of the flag indicates that some behavior may be questionable, but may not necessarily provide any identifying information, such as the activity, or the player performing the activity suspected of being undesirable. As such, the AI model 195 is configured to classify any activity within the associated telemetry data 424 as being undesirable behavior. In addition, the identification of player-B as the actor may be determined from the telemetry data (e.g., game state data, user profile data, and/or metadata). For example, the AI model 195 provides as output 615 flagged behavior performed by player-B as being undesirable.

In some implementations, the classification by the AI model 195 of undesirable behavior provides the verification that player-A is not abusing the flag system, and that the flag was generated in good faith. In that case, the classification of the flagged behavior is provided to the verification engine 610, which may resubmit that data to the machine learning engine 190 for training the AI model 195.

In other implementations, additional verification of the generated flag may be performed. For example, the verification engine 610 previously described may be utilized to provide additional verification. In particular, the flagged behavior classified by the AI model 195 is provided to verification engine 610. Also, video recording 623 or other relevant data may be provided. Verification can be performed in many ways, such as verification through crowd sourcing 601a, verification by one or more teammates 601b, verification by a compliance group 601c or moderation team, verification by one or more other players 601d, verification by one or more spectators 601n, and others. For example, a corresponding verification source may view the recording 603 to determine if any undesirable activity is noticed, and return a response back to the verification engine that verifies that the activity/behavior of player-B was undesirable, or acceptable. No response may indicate that the behavior of player-B was acceptable, or may be null data (e.g., an invalid response).

As previously described, the verification engine 610 may present the verified behavior back to the machine learning engine 190 for purposes of training the AI model 195, and/or updating the AI model (e.g., using a training phase). Features associated with the verified behavior are identified and/or accessed (e.g., from input to the machine learning engine 190) or newly extracted through the feature identifier 430, and provided as input to the machine learning engine 190. Parameters in the underlying AI model 195 can be modified and/or updated based on the verified responses, such as being strengthened (e.g., increase weighting) when the behavior is verified as being undesirable, or lessened when the behavior is verified as being acceptable. Supervised learning may be applied by the machine learning engine 190 to train the AI model 195 by assigning the verified behavior as being a true output 425.

As previously described, the flow diagram 600C may be configured to suggest through classification of behavior by player-B as being desirable, in another embodiment. In that manner, verification of desirable behavior may be achieved, and submitted to the machine learning engine 190 for purposes of updating/training and/or providing learning to the AI model 195 to better classify behavior as being desirable, wherein the AI model 195 may be configured to classify undesirable and/or desirable behavior. For example, parameters in the underlying AI model 195 can be modified and/or updated based on the verified responses, such as being strengthened (e.g., increase weighting) when the behavior is verified as being desirable, or lessened when the behavior is verified as being acceptable. Supervised learning may be applied by the machine learning engine 190 to train the AI model 195 by assigning the verified behavior as being a true output 425. In that manner, the AI model 195 may learn patterns of desired (e.g., good) behavior (e.g., teamwork, helping others, providing aid to other players, providing instructions to inexperienced players, etc.). Additional action may be taken, such as implementing an accolade system 120 for purposes of rewarding players that are acting in a desirable manner, such as by increasing their reputation within the online gaming community 200, as previously described.

Figure 6D:
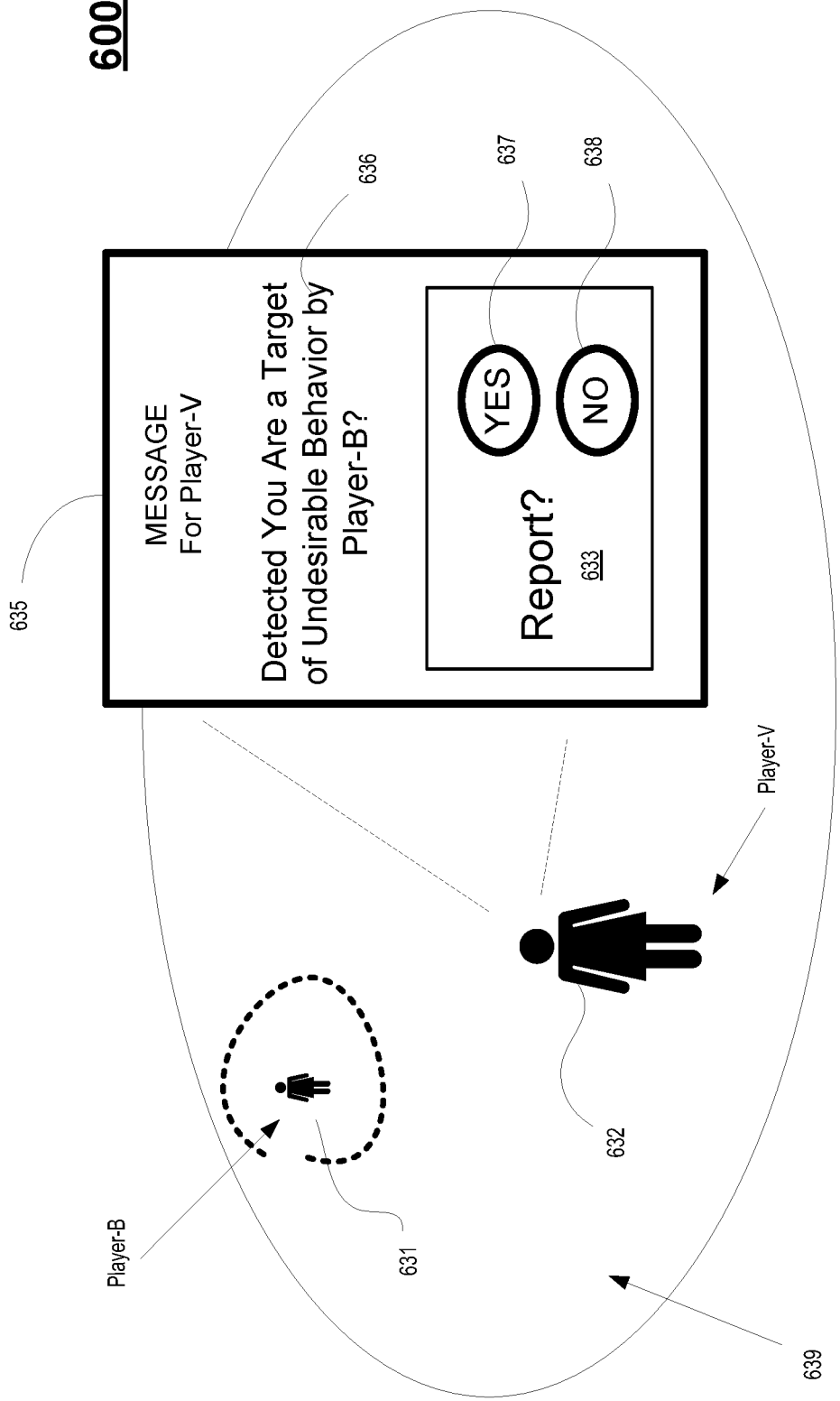
FIG. 6D illustrates a pop-up message requesting reporting of undesirable behavior, in accordance with one embodiment of the disclosure.

FIG. 6D illustrates a notification 635 (e.g., pop-up message) requesting reporting of undesirable behavior, in accordance with one embodiment of the disclosure. In particular, a system may detect undesirable behavior (e.g., abusive, bad, etc.) being performed by player-B (631), wherein the system may implement an AI model that is configured to classify undesirable behavior. The system may include the abuse response engine 145 which is configured to provide a seamless and frictionless way to report the undesirable behavior. For example, the notification 635 appears (e.g., pops-up) for a good player that may be the target and/or victim of undesirable behavior (e.g., abusive, bad, etc.) by player-B (611). In that manner, targeted players and/or victims that previously may have been reluctant to actively report unwanted behavior by others would have a quick and simple way to report the activity. Possible reasons for not reporting include because the targeted players and/or victims felt that the report would be ignored, that it would take too much time and effort, that it would affect current game play, that they did not know the reporting process or that it was a difficult process, etc. Because the notification 635 is provided without prompting from the targeted player and/or victim, provided in real-time, and originates from the system implementing the gaming sessions (e.g., cloud game network), targeted players and/or victims may now feel that the reporting would be taken seriously.

Screen shot 600D illustrates a gaming world 639, wherein player-V (632) and player-B (611) may be playing a video game in a multi-player gaming session. Screen shot 600D may be taken from the perspective of player-V (632), whose avatar is enlarged. Player-B (631) may be performing some action in the gaming world 639 that is classified to be undesirable behavior. Player-B (631) is shown in the background of the perspective shown to player-V (632), wherein the avatar of player-B is diminished in size.

Furthermore, after classifying undesirable behavior (e.g., abusive, bad, etc.) by player-B (631), the system may be able to further determine that the player-V (632) is the target of the undesirable behavior. For example, player-B (631) and player-V may be determined through telemetry data (e.g., game state data, user profile data, metadata, etc.). A pop-up message 635 and/or notification may be provided to player-V (632), such as without any prompting from player-V. A short title or description 636 is provided in pop-up message 615, and recognizes that player-V is the target of undesirable behavior (e.g., abusive, bullying, harassing, etc.). For example, the description 636 may indicate that player-B (631) appears to be "griefing," wherein the griefing is directed to player-V (632). For example, player-B (631) may no longer be trying to help win the match in a multi-player game, and player-V (631) is a teammate. Additional information describing the undesirable behavior by player-B (631) may optionally be provided in the notification 635, such as a clip (e.g., video, audio, etc.) of the behavior. In some cases the information is not needed, as player-V (632), being the targeted player and/or victim, is intimately aware of the undesirable behavior by player-B (631).

Interface 633 is provided within notification 635 to give an opportunity for player-V (632) to quickly report (e.g., one click) the undesirable behavior by player-B (631), such as through the abuse response engine 145. Interface 633 may be differently configured in various embodiments, wherein each embodiment allows player-V (632) the opportunity to report the undesirable behavior by player-B (631). Acknowledgement of the abuse by the system may confirm to player-V (632) that something might be done in response to a report of undesirable behavior. In that case, player-V (632) may file a report that the behavior by player-B is undesirable, and possibly that the behavior was directed to a targeted player and/or victim (i.e., player-V—632) by selecting the "YES" button 637. In one embodiment, the reporting of undesirable behavior is anonymous. Instructions may be provided to press some other button, such as control button "X". In some cases, player-V (632) can actively decline to report the undesirable behavior by player-B (631), such as by selecting the "NO" button 618. Instructions may be provided to press some other button, such as control button "SQUARE". An active decline does not necessarily imply that player-V accepts the undesirable behavior by player-B (631). Also notification 635 may quickly disappear if no response is made by player-V (632), which also does not necessarily imply that player-V accepts the undesirable behavior by player-B (631). Notification 635 may also provide player-V (632) an opportunity to elect additional action to be taken. For example, player-V may choose masking as described in FIG. 6E, or hiding as described in FIG. 6F.

Figure 6E:
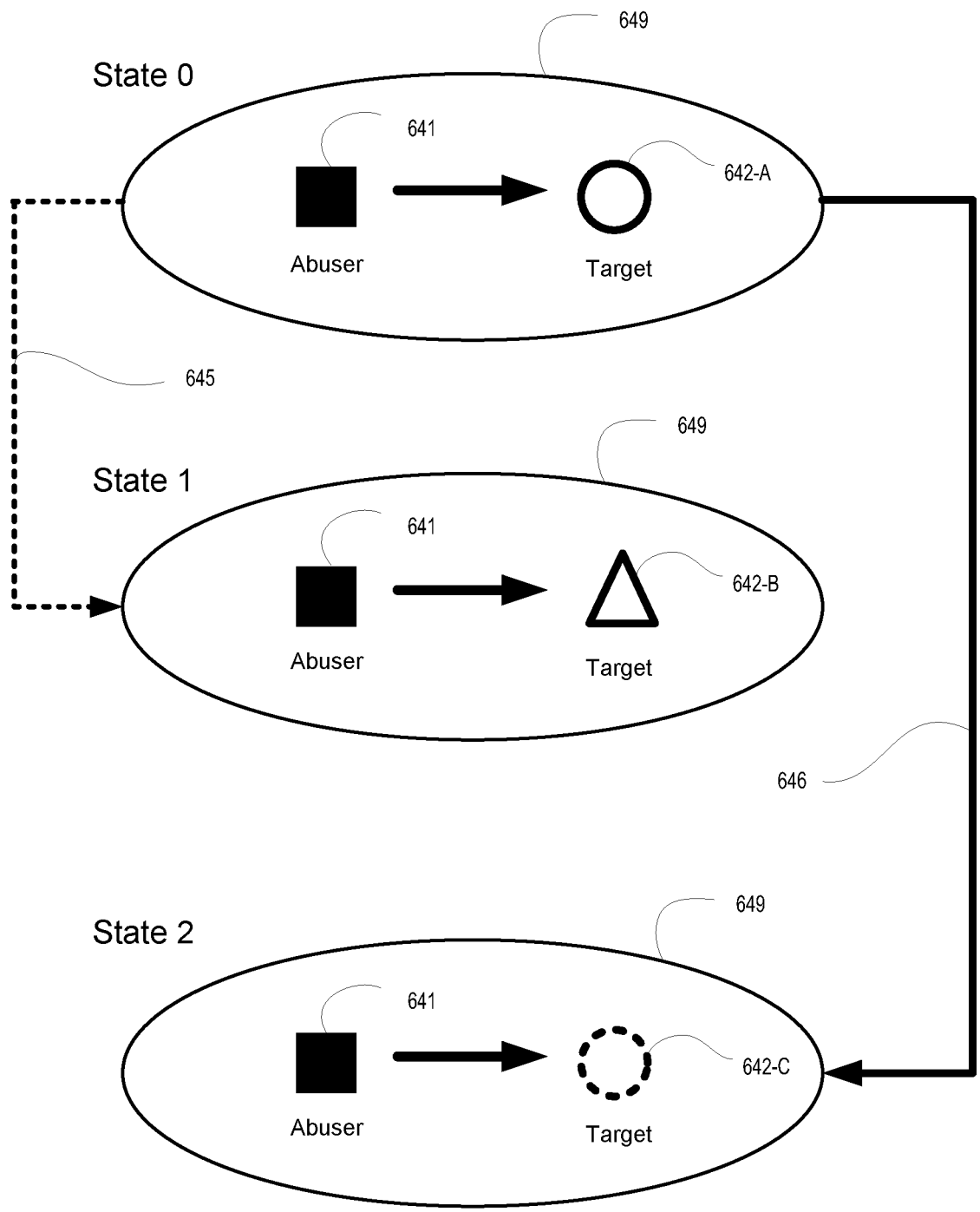
FIG. 6E illustrates the masking and removal of a player that is targeted by a player exhibiting or that has exhibited undesirable behavior towards the targeted player, in accordance with one embodiment of the disclosure.

In particular, FIG. 6E illustrates the masking and/or removal of a player 642 (e.g., targeted player and/or victim) that is targeted by a player 641 (e.g., abuser) exhibiting or that has exhibited undesirable behavior towards the player 642, in accordance with one embodiment of the disclosure. The abuser 641 and player 642 may be playing a video game in a multi-player gaming session that is associated with a gaming world 649. In addition, the behavior of abuser 641 may have previously been classified as being undesirable (e.g., abusive, bad, etc.). The classification may then allow the player 642 to diminish the effect of the undesirable behavior.

Gaming world 649 is shown in various states during the gaming session. For example, gaming world 649 is shown in state 0, state 1, and state 2. In particular, in state 0, the gaming world 649 includes the abuser 641 and the player 642-A in the same general area, such that player 642-A is the target of the undesirable behavior exhibited by abuser 641. The state of the player 642 parallels the state of the gaming world 649, and as such is in state 0, wherein player 642 in state 0 is labeled as player 642-A. In state 0, the player 642-A is represented by its avatar in its original state, such as without masking or any other modifications.

In state 0, the behavior of the abuser 641 may be classified as being undesirable, such as through an AI model. In addition, player 642-A may also be identified as being the target of the undesirable behavior.

The system (e.g., abuse response engine 145) in cooperation with the machine learning engine implementing the AI model may then provide additional options to the player 642. For example, a first option 645 allows for masking the player 642 from abuser 641. State 1 reflects the masking, wherein the state of the player 642 parallels the state of the gaming world 649, and as such is in state 1, such that player 642 in state 1 is labeled as player 642-B. State 1 may be in the same gaming session, or in the next or other gaming session. The masking may be performed without any interaction by the player 642 to avoid the abuser 641—i.e. happens automatically—or the masking may be performed at the request of the player 642, as previously described. In the masking case, player 642-B is masked from abuser 641, so that abuser 641 is unaware of the player 642-B. In particular, the avatar, or its state, for player 642-B may have changed between states 0 and 1. That is, the avatar for player 642-B may be a different character, gender, color, name, different avatar, etc. so that player 642-B and the corresponding avatar are unrecognizable by abuser 641 (i.e., in the viewpoint presented to abuser 641 of the gaming world 649). In one embodiment, player 642-B is not masked to other players in the gaming world 649, such that the avatar for player 642-B in state 2 is presented in its original state—i.e., without modification—even though player 642-B is still masked to abuser 641. As such, both the abuser 641 and player 642-B are still able to play the video in the same gaming session, and the player 642-B need not alter his or her gaming behavior. For example, player 642 may wish to remain in the gaming session, since other than the abuser 641, the gaming session may be entirely enjoyable.

A second option 646 allows for hiding the player 642 from abuser 641. State 2 reflects the hiding of the player 642, wherein the state of the player 642 parallels the state of the gaming world 649, and as such is in state 2, such that player 642 in state 2 is labeled as player 642-C. State 2 may be in the same gaming session, or in the next or other gaming session. The hiding may be performed without any interaction by the player 642 to avoid the abuser 641—i.e. happens automatically. In the hiding case, player 642-C is hidden from abuser 641. In particular, some or all traces of the avatar for player 642-C may be removed from the perspective of the gaming world 649 for abuser 641. That is, abuser 641 does not see player 642-C at all. In one embodiment, player 642-C is not hidden from the other players in the gaming world 649, such that the avatar for player 642-C in state 2 is presented in its original state—i.e., without modification—to other players, even though player 642-C is hidden from abuser 641. In one embodiment, player 642-C is visible to one or more other players that are marked or selected by the player 642-C. In another embodiment, player 642-C is able to see abuser 641. As such, both the abuser 641 and player 642-C are still able to play the video in the same gaming session, and the player 642-C is still able to play the video game in the gaming session without altering his or her behavior.

In one embodiment, both the abuser 641 and the player 642 are hidden from each other. That is, player 642 places abuser 641 on a blacklist, at least relative to the player 642. In that case, some or all traces of the avatar for player 642 may be removed from the perspective of the gaming world 649 for abuser 641, and likewise, some or all traces of the avatar for abuser 641 may be removed from the perspective of the gaming world 649 for player 642.

In another embodiment, instead of hiding the player 642 from the abuser 641 in a gaming session, the player 642 may be removed from the gaming session and assigned to a different gaming session. For example, the player 642 may be assigned to a different gaming server that operates a different gaming universe for the same video game that has a different set of players playing in the gaming universe but that does not include the abuser 641. In that manner, the character of the player 642 is respawned into a different gaming universe of the same video game.

Figure 6F:
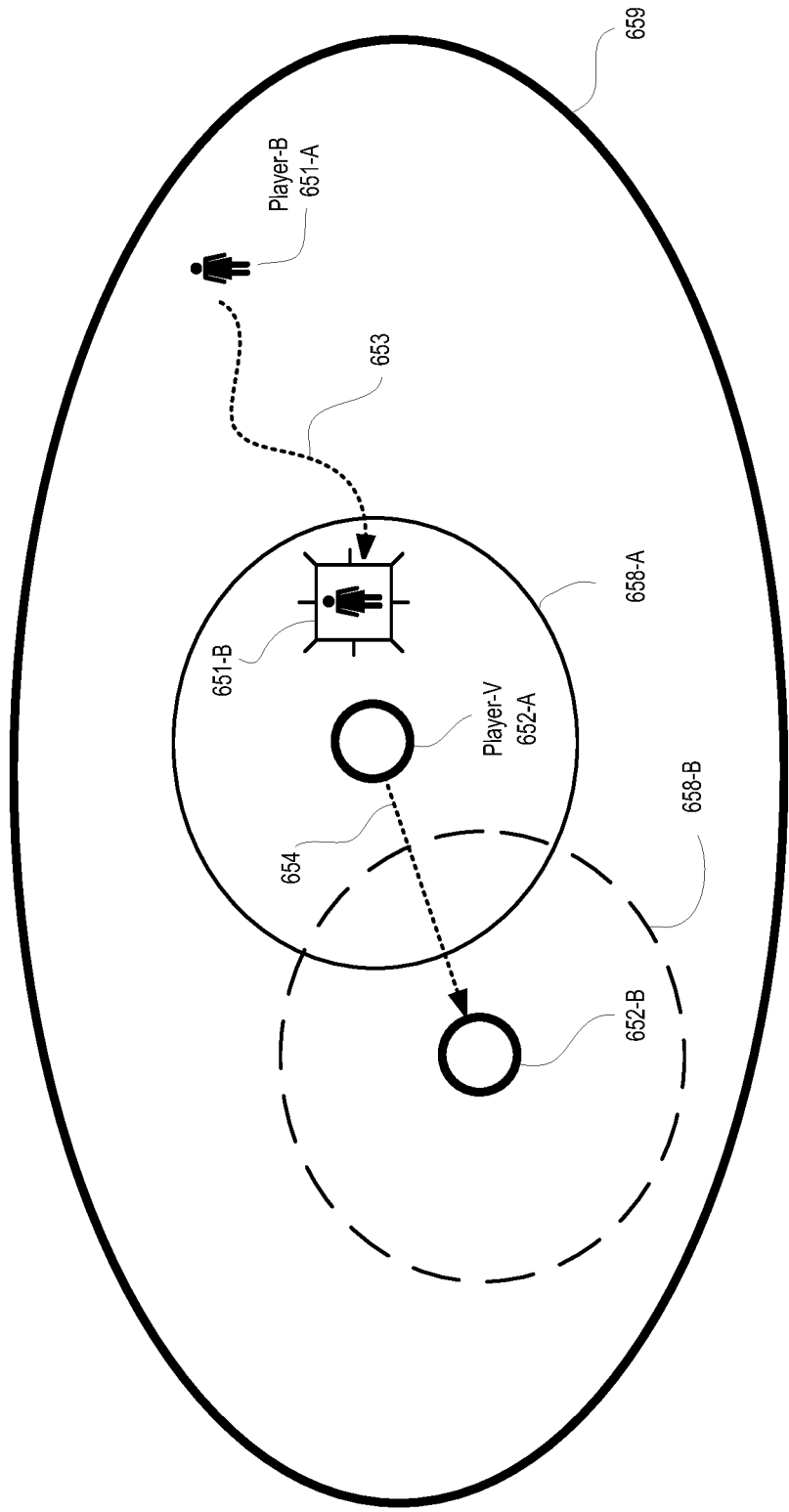
FIG. 6F illustrates the notification of the impending presence of marked player, in accordance with one embodiment of the disclosure.

FIG. 6F illustrates the notification of the impending presence of marked player, in accordance with one embodiment of the disclosure. In particular, player-B (651) and player-V 652 may be playing a video game in a multi-player gaming session that is associated with a gaming world 659. Previously, player-V (652) may have been a target of seemingly undesirable behavior (e.g., abusive, bad, etc.) exhibited by player-B, such that player-V may have been the target and/or a victim of the undesirable behavior. That undesirable behavior may have also been classified by the system implementing an AI model configured to classify player behavior. In another case, the behavior exhibited by player-B (651) may not rise to the level of being undesirable, though the behavior may be exceedingly offensive or annoying, especially to the targeted player and/or victim. In those cases, the player-V (652) (e.g., targeted player and/or victim) may decide to take advantage of the marking features.

In that case, player-V (652) may decide to mark player-B (651). The marking may be performed anonymously, and without player-B (651) even being aware of being marked, in one embodiment. For example, the marking may be made in a map available to player-V (652), but the marking is not available to any other player, especially player-B (651). In another embodiment, player-B (651) is notified of the marking, and information (e.g., video clip) may be provided in the notification indicating what was the undesirable behavior. As such, whenever player-B (651) comes into the area of player-V (652), the avatar of player-B is marked for the benefit of player-V. For example, player-B is shown moving through the gaming world 659 along path 653. In an initial location, player-B is labeled 651-A. After movement to a second location, player-B is labeled 651-B. In the second location, player B has moved within an area viewable within a perspective 658-A of player-V. As such, the avatar of player-B (651-B) is marked within the perspective 658-A of player-V. For example, the avatar of player-B (651-B) may be highlighted with a box that is pulsing or is marked with other eye catching patterns (e.g., sun rays, etc.). In some embodiments, the avatar of player-B (651) may become marked and visible to player-V (652) just beyond the outer boundary of the perspective 658-A. For example, the perspective 658-A may be extended within an area to include the encroaching player-B (651). In that case, the marked version of player-B (651) may become visible to player-V (652), but player-V (652) is not visible to player-B (651).

Because player-B (651-B) is highly visible to player-V (652-A), player-V may take additional action to avoid the player-B. As shown, player-V (652-A) may move to a second location along path 654. In an initial location, player-V (652) is labeled 652-A. After movement to a second location, player-V is labeled 652-B. In the second location, the perspective 658-B of player-V (652-B) does not include player-B (651-B), and has avoided contact with that player. Because of the marking feature, player-V (652) may continually take action to avoid player-B (651).

In still another embodiment, a notification may be provided to player-V (652) indicating that player-B (651) will soon become visible within the perspective of player-V. That is, as player-B (651) moves along path 653 and will soon pierce the boundary of the perspective 658-A of player-V (651-A), the notification is delivered to player-V. in that manner, player-V (652-A) may move to the second location along path 654, before either player-B (651) or player-V (652) becomes visible to each other. Because of the notification feature, player-V (652) may continually take action to avoid player-B (651).

Figure 6G:
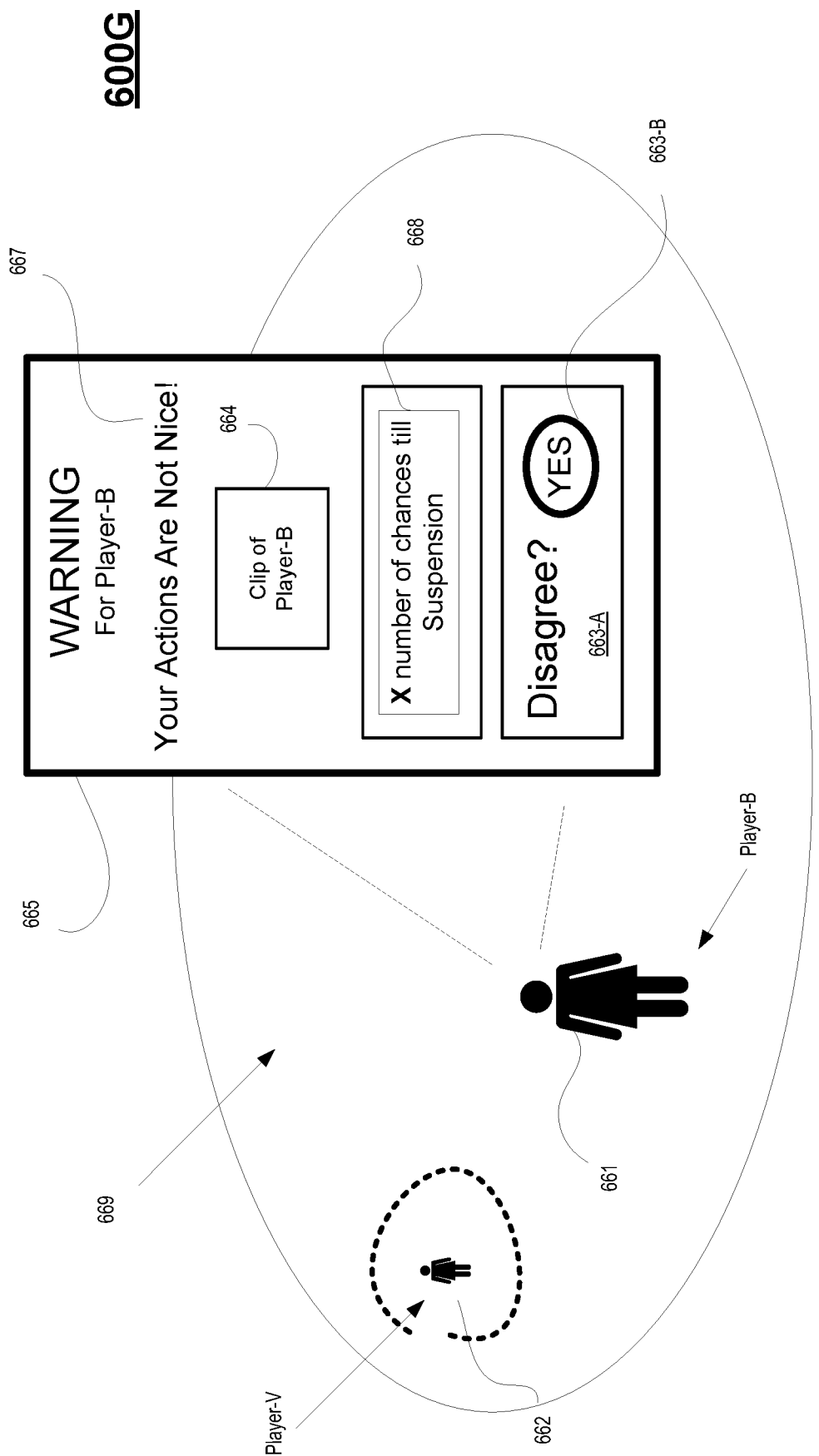
FIG. 6G illustrates a notification that is provided to a player identified as exhibiting undesirable behavior, in accordance with one embodiment of the disclosure.

FIG. 6G illustrates a notification 665 that is provided to player-B (661) identified as exhibiting undesirable behavior, in accordance with one embodiment of the disclosure. Notification 665 may be a pop-up message. Player-B (661) and player-V (662) may be playing a video game in a multi-player gaming session. Screen shot 600G illustrates a gaming world 669, wherein player-B (661) and player-V (662) may be playing a video game in a multi-player gaming session. Screen shot 600G may be taken from the perspective of player-B (661), whose avatar is enlarged. Player-B (661) may be performing some action in the gaming world 669 that is classified to be undesirable behavior, wherein the target of the undesirable behavior may be player-V (662), wherein player-V is shown in the background of the perspective shown to player-B (661), wherein the avatar of player-V is diminished in size.

In particular, a system may detect undesirable behavior (e.g., abusive, bad, etc.) being performed by player-B (661), wherein the system may implement an AI model that is configured to classify undesirable behavior. The system may include the abuse response engine 145 which is configured to provide a warning to player-B (661) as feedback so that player-B is given an opportunity to remedy his or her behavior. For example, the notification 665 appears (e.g., pops-up) for player-B (661), the player exhibiting undesirable behavior (e.g., abusive, bad, etc.). If the notification 665 is provided early and with enough enforcement measures, then player-B (661) may be convinced to alter his or her behavior or the player may be suspended. In that manner, player-V (662) need not change his or her pattern of game play.

A title or description 667 providing notification that player-B (661) is an "Abuser." For example, the description 667 may state: "Hello Player-B! You have been flagged for bad behavior in Video Game 'K'." Additional information may also be provided, such as the game being played by player-B, the means for identification of player-B for bad behavior (e.g., player flagging, the number of players flagging the behavior, player reporting, system identification, etc.).

Identification of the undesirable behavior may also be provided in notification 665 through various methods. For example, the notification 665 may state: "Our systems have determined your offense to be—Offense 'Y'." In another example, a clip 664 (e.g., video, audio, etc.) of the undesirable behavior may be provided within notification 665. Other information may be used (e.g., text, etc.) that identifies the undesirable behavior in the notification 665. In still another example, notification 665 may indicate that access to video capture of the undesirable behavior is available by pressing a certain control button.

The notification 665 may be provided to player-B (661) as soon as undesirable behavior was identified (e.g., through AI model, reporting, flagging, etc.). In the meantime, the capture of the undesirable behavior (e.g., abusive, bad, etc.) may be analyzed to positively confirm that the behavior is undesirable, such as when the behavior was flagged or reported. For example, the behavior may be classified as being undesirable through an AI model, and/or verified through various sources (e.g., crowd sourcing, player verification, teammate verification, etc.), as previously described.

If the behavior was confirmed as being undesirable, additional information may be displayed to the player-B (661). For example, notification 665 may state: "When you have reached 'X' instances of bad behavior, you will be suspended from the gaming network (or social network) for 'W' number of days," or some other time period (e.g., gaming session, minutes, hours, days, weeks, permanently, etc.). Another statement may identify the targeted player, such as when the notification 665, and provide suggestions on how to change the behavior, and if the undesired behavior persists then player-B would be subjected to a suspension. That is, the goal is to provide feedback to player-B in an effort to change behavior of the offending player and/or reform the offending player. As such, information box 668-A may indicate to player-B (661) the number of chances—"X"—to change his or her behavior before additional action is taken, such as suspension. Additional details may be provided through a link.

Notification 665 may give player-B (661) an opportunity to contest the determination that player-B is exhibiting undesirable behavior. That is, player-B (661) may believe that the system is incorrect, or may believe that there was fraudulent reporting or flagging, and would like an opportunity to contest. For example, interface 663-A provides an opportunity to contest the determination that player-B (661) is exhibiting undesirable behavior. In particular, by selecting the YES button 663-B, a process is initiated where player-B (661) is able to argue innocence. Other methods for initiating a contesting process may be implemented, such as selecting a control button (e.g., "SQUARE").

In another embodiment, notification 665 may be sent to the message box of player-B (661) in association with a social gaming network. This may be implemented when player-B (661) is detected to be away from the keyboard (AFK) for an extended period of time.

FIG. 6H illustrates a mini-report 600H that provides for quick acknowledgment of undesirable behavior and/or desirable behavior, in accordance with one embodiment of the disclosure. As shown, the mini-report 600H may be presented to player-X during a post-game breakdown session, wherein player-X is a participant in a multi-player gaming session for a video game. The multi-player gaming session may have a plurality of players participating, including players 1-N. Player-X may be part of a team of players, or may be operating solo, depending on the nature of the video game. Mini-report 600H provides a quick way to report undesirable behavior by a player in the gaming session, and/or to report desirable behavior by a player in the gaming session. The reporting of undesirable behavior may be anonymous, in one implementation. In one embodiment, the mini-report 600H is limited to acknowledging players on the team for player-X. In other embodiments, the mini-report 600H is open to acknowledging all players in the gaming session.

In particular, section 671 provides a quick way for player-X to give an accolade to another player in the gaming session. Each of the players available for giving an accolade by player-X is listed in section 671. In one embodiment, not all players in the gaming session are listed, so that only the best candidates for giving an accolade are listed in section 671. Each of the players listed in section 671 has a corresponding value that quickly indicates how good at exhibiting desirable behavior that player was during the gaming session. The higher the value, the better the player was at exhibiting desirable behavior, such as those promoting the well-being of the online gaming community for that video game, or for multiple video games. The valuation may be compared to all players in the same gaming session, or to players in multiple gaming sessions, in embodiments. In another embodiment, the valuation may be a ranking of selective (e.g., teammates) players or all players within the gaming session, wherein the ranking lists the players in order of how well they exhibited desirable behavior. As shown, player-X has selected player-N (having a valuation of 89%) to give an accolade, wherein accolades were previously introduced. In another embodiment, instead of issuing an accolade the selection of player-N provides a report indicating that player-N exhibited the most or best desirable behavior among players in a gaming session.

Section 672 provides a quick way for player-X to report another player for exhibiting undesirable behavior in the gaming session. Each of the players available for reporting undesirable behavior by player-X is listed in section 672. In one embodiment, not all players in the gaming session are listed, so that only the most likely candidates for reporting for undesirable behavior are listed in section 671. Also, the players listed in section 672 may not match the players listed in section 671 (e.g., for giving an accolade). Each of the players listed in section 672 has a corresponding value that quickly indicates how much that player exhibited undesirable behavior during the gaming session. The higher the value, the more undesirable behavior that player exhibited during the gaming session, or the more effective the undesirable behavior was at negatively influencing the game play of another player during the gaming session. The valuation may be compared to all players in the same gaming session, or to players in multiple gaming sessions, in embodiments. In another embodiment, the valuation may be a ranking of selective (e.g., teammates) players or all players within the gaming session, wherein the ranking lists the players in order of how much they exhibited undesirable behavior. As shown, player-X has selected player-0 (having a valuation of 85%) for reporting as exhibiting undesirable behavior.

In another embodiment, the listings provided in the mini-report 600H may be used for crowd sourcing by players within the gaming session. For example, all players in the gaming session, or a select group of players (e.g., teammates) in the gaming session, may each be presented with the mini-report 600H. After collection of results from the mini-report, one player can be voted on for being the best player, or best teammate, etc. (e.g., player receiving the most accolade points).

In still another embodiment, at the end of a gaming session, in addition to or instead of showing game scores and other game related statistics, other information related to behavior may be shown to players. For example, when undesirable behavior is captured during a gaming session and classified, the one or more players who performed that undesirable behavior may be identified, and labeled as abusers. A list of abusers for that gaming session may also be provided within the game related statistics that are shown at the end of the gaming session, such as in a post-game breakdown. The list may include players that have characteristics of undesirable behavior, but that may not have reached a level of being classified as being undesirable. This allows those players on the list to modify their behaviors before they reach a level where they can be classified as undesirable behavior.

In another embodiment, players may be identified as being bad players or abusers (i.e., those that exhibit undesirable behavior, or have characteristics of exhibiting undesirable behavior), and good players. Degrees of being bad may also provide finer resolutions of identification. That identification may be included within a corresponding user profile. In that manner, as teams are being built for multi-player gaming sessions, whether a player is bad or not, or degree of badness, is taken into consideration. For example, bad players of varying degrees may be placed together on a team, as players who are willing to exhibit undesirable behavior towards other players may not be as offended, and even may not mind, when a teammate exhibits undesirable behavior that is directed to them. On the other hand, a good player may not want to be the target of undesirable behavior, and as such the matchmaking would avoid placing a bad player (i.e., exhibiting undesirable behavior) and a good player on the same team. In other cases, teams are balanced according to whether a player is bad or not. That is, bad players (i.e. exhibiting undesirable behaviors) may be spread across multiple teams in a gaming session. In that manner, the negative effect of the bad players on their respective teams would be evenly spread out in the same gaming session.

In another embodiment, the developer of a video game may set the level of aggressiveness in relation to whether a player is exhibiting undesirable behavior towards others. That is, the level of aggressiveness can be tuned. For example, some games (e.g., first person shooter) require a certain level of aggressiveness and/or craziness that if exhibited when playing other games (e.g., building a farm or utopian society) may be considered to be undesirable (e.g., abusive, bad, etc.). Many of these games requiring aggressiveness may involve the killing of other player's characters in order to win a gaming session. As such, the game developer may define the level of aggressiveness that is tolerated within the corresponding video game. If a player exceeds the level, then that player may be flagged for exhibiting undesirable behavior, with additional consequences to follow (e.g., warning, suspension, banning, etc.).

The game developer may also set other limits, such as the number of times a player can generate a flag for potential undesirable behavior, set boundaries on what actions can be flagged, set threshold of acceptable actions, set extreme regions of undesirable actions, etc.

In another embodiment, a report of a player-C exhibiting desirable or undesirable behavior may be generated and delivered to a requesting entity. For example, player-C may be a child, and the requesting entity may be a parent of the child. In that manner, the parent can get an understanding of how player-C interacts within the online gaming community. In particular, as player-C engages in one or more gaming sessions, a system configured to classify player behavior (e.g., using an AI model) is able to classify all the activities relating to the behavior of player-C over a period of time (e.g., gaming session, one or more days, weekly, etc.). The activities and their classifications may be presented in a report that is provided to the requesting entity (e.g., parent). For example, the report may indicate that player-C is engaging in an activity that spikes, or is higher than the average number of times any player engages in that activity. This may be evidence of undesirable behavior (e.g., spamming using emoticons, etc.). For example, the child may be having contact with another player that may be a child predator. As evidence, the child may have a have a higher number of communication contacts with that player that exhibits undesirable behavior (e.g., that has been labeled as an abuser, or may be a child predator) than normal, the child may have a high number of communication contacts during gaming session which indicates abuse of one or more communication mediums (e.g., abuse of chat feature), have a number of friend requests that exceeds an average, has communication with another player (e.g., predator) that is of an age difference that exceeds a threshold, etc. The report may issue a warning, such as "WARNING: your child has had contact with a known abuser or harasser." In addition, the report may indicate emotional behavior of the player-C (e.g., exhibiting cool behavior, excited behavior, depressed behavior, etc.). Behavior may be monitored through biometrics (e.g., rate of eye blinking, sweatiness, loudness of voice, pitch of voice, heartbeat) as well as the classification of game player activity and/or behavior. By generating a report, the requesting entity (e.g., parent) may issue rewards that are tied to the behavior. For example, parent may give more time for gaming to the child, the parent may issue one or more accolades, etc. In addition, the requesting entity may issue penalties that are tied to the behavior of the child. For example, the parent may restrict the time for gaming, etc. As such, the report may be used as a grading system (e.g., behavior ranking or quantification of behavior of the child) for controlling access to gaming.

In still another embodiment, the system for classifying player behavior may be used to report exploitation within a video game. For example, the system may determine that a feature is being overused within a video game, and that overuse exhibits undesirable behavior. In other words, the feature is being exploited to abuse other players. For example, one or more players may be spamming with emoticons within the video game to negatively influence the game play of other players (e.g., cover the entire screen with emoticons). Once the developer of the video game is notified of the potential use of the feature for undesirable behavior (e.g., abusive, bad, etc.), then the game developer may issue a patch to the game that limits that behavior through modification, optimization, and/or removal of that feature. For example, the patch may limit the number of times a player may use emoticons.

Figure 7:
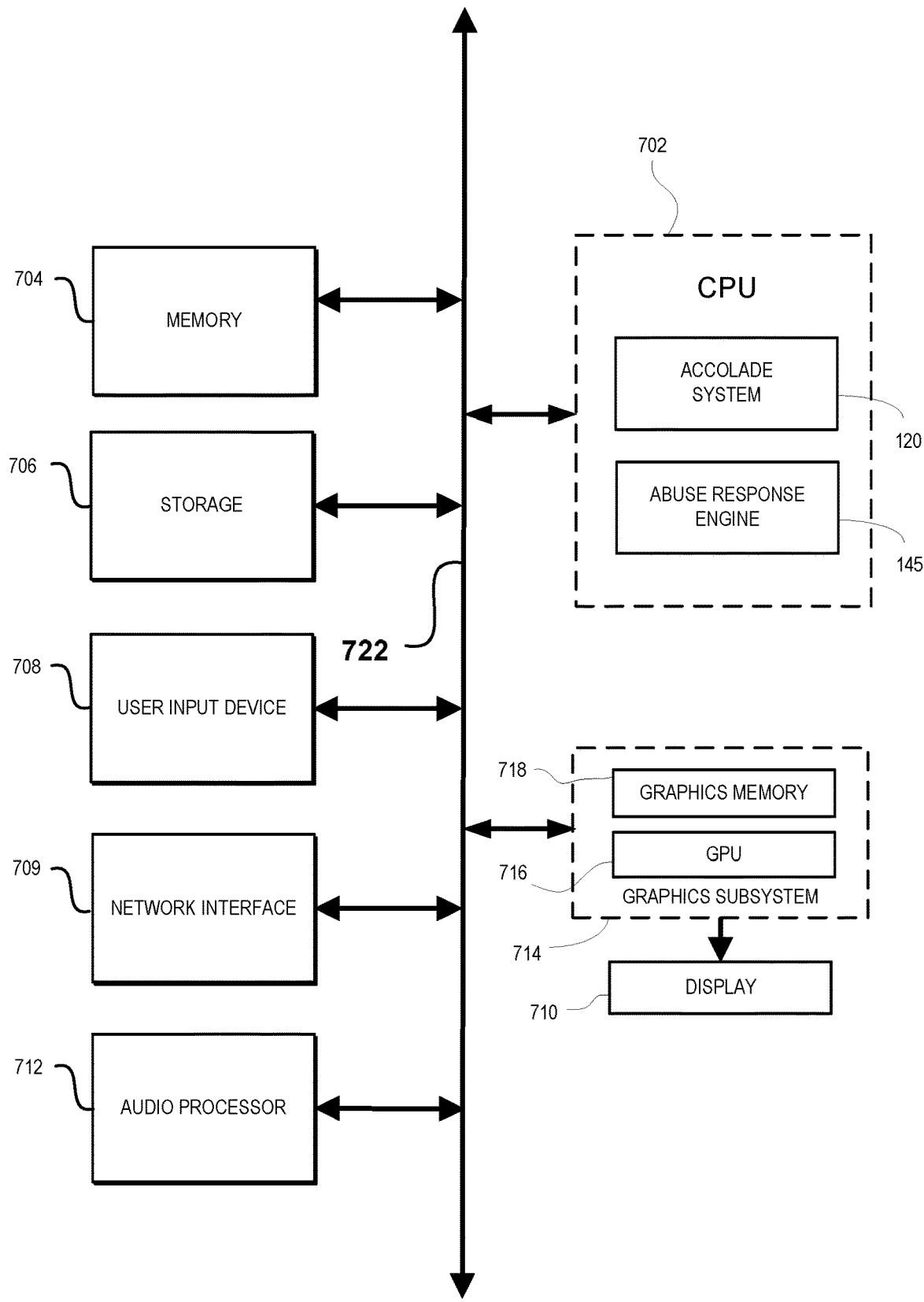
FIG. 7 illustrates components of an example device that can be used to perform aspects of the various embodiments of the present disclosure.

FIG. 7 illustrates components of an example device 700 that can be used to perform aspects of the various embodiments of the present disclosure. For example, FIG. 7 illustrates an exemplary hardware system suitable for classifying undesirable behavior and/or desirable behavior in players of a gaming session, in accordance with embodiments of the present disclosure. This block diagram illustrates a device 700 that can incorporate or can be a personal computer, a server computer, gaming console, mobile device, or other digital device, each of which is suitable for practicing an embodiment of the invention. Device 700 includes a central processing unit (CPU) 702 for running software applications and optionally an operating system. CPU 702 may be comprised of one or more homogeneous or heterogeneous processing cores.

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

CPU 702 may be configured to implement an abuse response engine 145 and/or an accolade system 120. As previously described, the abuse response engine 145 is configured to classify player behavior, and to take additional actions in responses to the classifications. For example, a player may be determined to be exhibiting undesirable behavior (e.g., being abusive towards another player), and a warning may be given to that player to stop the undesirable behavior. Also, the accolade system 120 is configured to issue accolades to players that are exhibiting desirable behavior. In that manner, desirable behavior among players may be promoted within an online gaming community.

Memory 704 stores applications and data for use by the CPU 702 and GPU 716. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, and/or microphones. Network interface 709 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, graphics subsystem 714 including GPU 716, memory 704, data storage 706, user input devices 708, network interface 709, and audio processor 712 are connected via one or more data buses 722.

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702.

Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs. In one embodiment, GPU 716 may be implemented within an AI engine (e.g., machine learning engine 190) to provide additional processing power, such as for the AI, machine learning functionality, or deep learning functionality, etc.

The graphics subsystem 714 periodically outputs pixel data for an image from graphics memory 718 to be displayed on display device 710, or to be projected by a projection system (not shown). Display device 710 can be any device capable of displaying visual information in response to a signal from the device 700, including CRT, LCD, plasma, and OLED displays. Device 700 can provide the display device 710 with an analog or digital signal, for example.

In other embodiments, the graphics subsystem 714 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for classifying undesirable player behavior (e.g., abusive, bad, etc.) and/or desirable player behavior (e.g., good, promote well-being of online gaming community, etc.).

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:
1. A method, comprising:
monitoring a plurality of game plays of a plurality of players playing a video game in a multi-player gaming session;

extracting features from the plurality of game plays related to a plurality of activities controlled the plurality of players, wherein the plurality of activities are performed within the plurality of game plays;

classifying an activity by an artificial intelligence (AI) learning model as desirable behavior by a player, based on the features being provided as input to the AI learning model, wherein the desirable behavior is used for building an online reputation of the player;

sending a notification to a second player, wherein the notification includes a video recording of the activity classified as the desirable behavior;

receiving selection of an icon by the second player to provide an accolade to the player; and providing the accolade to the player, wherein an accumulation of accolades by the player builds the online reputation of the player within an online community.

2. The method of claim 1, further comprising:

issuing an accolade to the player in association with the activity classified as the desirable behavior, wherein the desirable behavior positively impacts a gaming experience of another player, wherein an accumulation of accolades by the player builds the online reputation of the player within an online community.

3. The method of claim 1, further comprising:

receiving telemetry data associated with the plurality of game plays, wherein the telemetry data includes at least one of:
user saved data of a corresponding game play of a corresponding player; or
game state data of the corresponding game play; or
metadata of the corresponding game play.

4. The method of claim 1, further comprising:

identifying features associated with the possible desirable activity corresponding to the activity classified as the desirable behavior;

inputting the features associated with the possible desirable activity to the AI learning model for purposes of training the AI learning model; and marking each of the features associated with the possible desirable activity as being a true indicator of a class indicating the desirable behavior.

5. The method of claim 1, further comprising:

receiving a flag from a flagging player indicating possible desirable activity in the gaming session, wherein the possible desirable activity corresponds with the activity that is classified as the desirable behavior;

generating a video recording of the possible desirable activity;

presenting the video recording to a group of players; and receiving a determination from the group of players that the possible desirable activity corresponding to the activity classified as the desirable behavior is desirable.

6. The method of claim 1, further comprising:

generating a video recording of the activity classified as the desirable behavior;

determining another player with a character that is aware of the activity classified as the desirable behavior;

sending the video recording within an accolade interface to a device of the another player;

receiving selection of an icon in the accolade interface to provide an accolade to the player; and providing the accolade to the player, wherein an accumulation of accolades by the player builds the online reputation of the player within an online community.

7. A non-transitory computer-readable medium storing a computer program for performing a method, the computer-readable medium comprising:

program instructions for monitoring a plurality of game plays of a plurality of players playing a video game in a multi-player gaming session;

program instructions for extracting features from the plurality of game plays related to a plurality of activities controlled the plurality of players, wherein the plurality of activities are performed within the plurality of game plays; and program instructions for classifying an activity by an artificial intelligence (AI) learning model as desirable behavior by a player, based on the features being provided as input to the AI learning model, wherein the desirable behavior is used for building an online reputation of the player;

program instructions for sending a notification to a second player, wherein the notification includes a video recording of the activity classified as the desirable behavior;

program instructions for receiving selection of an icon by the second player to provide an accolade to the player; and program instructions for providing the accolade to the player, wherein an accumulation of accolades by the player builds the online reputation of the player within an online community.

8. The non-transitory computer-readable medium of claim 7, further comprising:

program instructions for issuing an accolade to the player in association with the activity classified as the desirable behavior, wherein the desirable behavior positively impacts a gaming experience of another player, wherein an accumulation of accolades by the player builds the online reputation of the player within an online community.

9. The non-transitory computer-readable medium of claim 7, further comprising:

program instructions for receiving telemetry data associated with the plurality of game plays, wherein the telemetry data includes at least one of:
user saved data of a corresponding game play of a corresponding player; or
game state data of the corresponding game play; or
metadata of the corresponding game play.

10. The non-transitory computer-readable medium of claim 7, further comprising:

program instructions for identifying features associated with the possible desirable activity corresponding to the activity classified as the desirable behavior;

program instructions for inputting the features associated with the possible desirable activity to the AI learning model for purposes of training the AI learning model; and program instructions for marking each of the features associated with the possible desirable activity as being a true indicator of a class indicating the desirable behavior.

11. The non-transitory computer-readable medium of claim 7, further comprising:

program instructions for receiving a flag from a flagging player indicating possible desirable activity in the gaming session, wherein the possible desirable activity corresponds with the activity that is classified as the desirable behavior;

program instructions for generating a video recording of the possible desirable activity;

program instructions for presenting the video recording to a group of players; and program instructions for receiving a determination from the group of players that the possible desirable activity corresponding to the activity classified as the desirable behavior is desirable.

12. The non-transitory computer-readable medium of claim 7, further comprising:

program instructions for generating a video recording of the activity classified as the desirable behavior;

program instructions for determining another player with a character that is aware of the activity classified as the desirable behavior;

program instructions for sending the video recording within an accolade interface to a device of the another player;

program instructions for receiving selection of an icon in the accolade interface to provide an accolade to the player; and program instructions for providing the accolade to the player, wherein an accumulation of accolades by the player builds the online reputation of the player within an online community.

13. A computer system comprising:

a processor;

memory coupled to the processor and having stored therein instructions that, if executed by the computer system, cause the computer system to execute a method, comprising:

monitoring a plurality of game plays of a plurality of players playing a video game in a multi-player gaming session;

extracting features from the plurality of game plays related to a plurality of activities controlled the plurality of players, wherein the plurality of activities are performed within the plurality of game plays; and classifying an activity by an artificial intelligence (AI) learning model as desirable behavior by a player, based on the features being provided as input to the AI learning model, wherein the desirable behavior is used for building an online reputation of the player;

sending a notification to a second player, wherein the notification includes a video recording of the activity classified as the desirable behavior;

receiving selection of an icon by the second player to provide an accolade to the player; and providing the accolade to the player, wherein an accumulation of accolades by the player builds the online reputation of the player within an online community.

14. The computer system of claim 13, the method further comprising:

issuing an accolade to the player in association with the activity classified as the desirable behavior, wherein the desirable behavior positively impacts a gaming experience of another player, wherein an accumulation of accolades by the player builds the online reputation of the player within an online community.

15. The computer system of claim 13, the method further comprising:

receiving telemetry data associated with the plurality of game plays, wherein the telemetry data includes at least one of:
user saved data of a corresponding game play of a corresponding player; or
game state data of the corresponding game play; or
metadata of the corresponding game play.

16. The computer system of claim 13, the method further comprising:

identifying features associated with the possible desirable activity corresponding to the activity classified as the desirable behavior;

inputting the features associated with the possible desirable activity to the AI learning model for purposes of training the AI learning model; and marking each of the features associated with the possible desirable activity as being a true indicator of a class indicating the desirable behavior.

17. The computer system of claim 13, the method further comprising:

generating a video recording of the activity classified as the desirable behavior;

determining another player with a character that is aware of the activity classified as the desirable behavior;

sending the video recording within an accolade interface to a device of the another player;

receiving selection of an icon in the accolade interface to provide an accolade to the player; and providing the accolade to the player, wherein an accumulation of accolades by the player builds the online reputation of the player within an online community.

18. A method, comprising:

monitoring a plurality of game plays of a plurality of players playing a video game in a multi-player gaming session;

extracting features from the plurality of game plays related to a plurality of activities controlled the plurality of players, wherein the plurality of activities are performed within the plurality of game plays;

classifying an activity by an artificial intelligence (AI) learning model as desirable behavior by a player, based on the features being provided as input to the AI learning model, wherein the desirable behavior is used for building an online reputation of the player;

generating a video recording of the activity classified as the desirable behavior;

determining another player with a character that is aware of the activity classified as the desirable behavior;

sending the video recording within an accolade interface to a device of the another player;

receiving selection of an icon in the accolade interface to provide an accolade to the player; and providing the accolade to the player, wherein an accumulation of accolades by the player builds the online reputation of the player within an online community.

19. A non-transitory computer-readable medium storing a computer program for performing a method, the computer-readable medium comprising:

program instructions for monitoring a plurality of game plays of a plurality of players playing a video game in a multi-player gaming session;

program instructions for extracting features from the plurality of game plays related to a plurality of activities controlled the plurality of players, wherein the plurality of activities are performed within the plurality of game plays;

program instructions for classifying an activity by an artificial intelligence (AI) learning model as desirable behavior by a player, based on the features being provided as input to the AI learning model, wherein the desirable behavior is used for building an online reputation of the player;
program instructions for generating a video recording of the activity classified as the desirable behavior;
program instructions for determining another player with a character that is aware of the activity classified as the desirable behavior;
program instructions for sending the video recording within an accolade interface to a device of the another player;
program instructions for receiving selection of an icon in the accolade interface to provide an accolade to the player; and
program instructions for providing the accolade to the player,
wherein an accumulation of accolades by the player builds the online reputation of the player within an online community.

20. A computer system comprising:

a processor;

memory coupled to the processor and having stored therein instructions that, if executed by the computer system, cause the computer system to execute a method, comprising:

monitoring a plurality of game plays of a plurality of players playing a video game in a multi-player gaming session;
extracting features from the plurality of game plays related to a plurality of activities controlled the plurality of players, wherein the plurality of activities are performed within the plurality of game plays;
classifying an activity by an artificial intelligence (AI) learning model as desirable behavior by a player, based on the features being provided as input to the AI learning model, wherein the desirable behavior is used for building an online reputation of the player;
generating a video recording of the activity classified as the desirable behavior;
determining another player with a character that is aware of the activity classified as the desirable behavior;
sending the video recording within an accolade interface to a device of the another player;
receiving selection of an icon in the accolade interface to provide an accolade to the player; and
providing the accolade to the player,
wherein an accumulation of accolades by the player builds the online reputation of the player within an online community.

* * * * *